United States Patent [19]

Oller et al.

[11] 4,395,290

[45] Jul. 26, 1983

[54] METHOD OF MANUFACTURING CEMENT RAW MIX

[75] Inventors: Osvaldo A. Oller, Cape Girardeau, Mo.; Eric R. Hansen, Omaha, Neb.; Gerald L. Eaker, Cape Girardeau, Mo.

[73] Assignee: Gulf & Western Industries, Inc., New York, N.Y.

[21] Appl. No.: 339,089

[22] Filed: Jan. 13, 1982

[51] Int. Cl.$^3$ ............................................... C04B 7/02
[52] U.S. Cl. ................................................... 106/100
[58] Field of Search ........................................ 106/100

[56] References Cited

U.S. PATENT DOCUMENTS

| | | | |
|---|---|---|---|
| 2,883,173 | 4/1959 | Laboulais | 263/32 |
| 2,969,227 | 1/1961 | Ludwig | 263/33 |
| 2,977,105 | 3/1961 | Pyzel | 263/21 |
| 3,233,973 | 2/1966 | Veo et al. | 23/230 |
| 3,437,325 | 4/1969 | Putnam et al. | 263/32 |
| 3,483,363 | 12/1969 | Ross | 235/151.1 |
| 3,602,488 | 8/1971 | Romig | 263/32 |
| 3,835,873 | 9/1974 | Wildpaner | 137/3 |

*Primary Examiner*—James Poer
*Attorney, Agent, or Firm*—Woodard, Weikart, Emhardt & Naughton

[57] ABSTRACT

A process for the production of cement raw mix which takes into account variations which may occur in the raw materials being introduced into the raw mix, particularly such variations which occur in the limestone. The process disclosed involves the periodic adjustment in the estimated chemical composition of the raw materials used to produce the raw mix in response to the degree of divergence between the actual proportions ($W_i$) of the raw materials mixed and the "theoretical" proportions ($T_i$) which theoretically would have generated the raw mix that was produced over the previous time interval. Based upon the revised estimated chemical compositions, the desired characteristics of the raw mix over the next specific subsequent interval are reselected to adjust the overall chemical composition of the raw mix towards the overall desired characteristics, while maintaining continuity in the raw mix being produced and avoiding undesirable fluctuations in the composition. The disclosed method incorporates the detection of weighfeeder malfunctions through the comparison of the degree of divergence for each raw material with selected maximum permissible divergences. Actual characteristics of the raw mix produced are estimated through the use of a time weight raw mix matrix.

21 Claims, 2 Drawing Figures

METHOD OF MANUFACTURING CEMENT RAW MIX

BACKGROUND OF THE INVENTION

1. Field of the Invention

The field of the invention is the manufacture of cement, more particularly the field is the mixing of raw materials to produce a cement raw mix for feeding into a kiln.

2. Brief Description of the Prior Art

In the cement making process, limestone is mixed with other materials to form a cement raw mix. Typical materials that may be mixed with the limestone to form the raw mix are diaspore (source of aluminum oxide), tripoli (source of silica oxide), and fly ash (source of iron oxide). The raw mix produced is then fed into a kiln where it undergoes a calcination process.

The characteristics of the final product are determined by (1) chemical composition of the raw mix, (2) conditions in the kiln, and (3) the extent of the exposure of the raw mix in the kiln during the calcination process. Further, the extent to which the raw mix is to be exposed in the kiln will vary depending upon the actual composition of the raw mix. In producing a quality cement, the raw mix should ideally have a constant homogenous composition with a small standard of deviation.

However, it is difficult to produce a constant homogeneous mix because the raw materials, particularly the limestone, are susceptible to variations in the chemical composition as they are fed into the raw mix. For example, the composition of the limestone may vary over time because of: (a) variations in the extent of overburden mixed with the limestone; (b) variations within the chemical composition within the rock itself; and (c) changes in the moisture content in the stone.

Other problems encountered in maintaining a uniform composition in the raw mix involve the extremely large quantities of raw material being mixed and the possibility of weighfeeder malfunctions. Because of the extremely large quantities involved, direct analysis of the stone may not even accurately represent the composition of the stone at any one given point in time, much less accurately represent the composition over any extended period. When a weighfeeder malfunction goes undetected, the raw materials may be mixed in entirely different ratios from those intended.

In the past, it has been a common practice for a "mix analyst" to periodically test the raw mix composition. After testing the raw mix composition, the mix analyst then compares the actual composition with the desired composition of the raw mix to be fed into the kiln. Based upon this comparison, the mix analyst adjusts the relative proportions of the raw materials being supplied to the raw mix to compensate for deficiencies in any particular necessary raw material. For instance, after checking the chemical composition of the raw mix at a given time, the analyst may determine that the composition is low in silica oxide. To compensate for this deficiency, the analyst then approximates how much more sand is needed to eliminate the silica oxide deficiency, and adds proportionately more sand over the next time interval. At the end of the next time interval, he agains checks the raw mix composition to determine whether any further correction need to be made. This process has inherent limitations in that is is dependent upon the intuition and experience of the mix analyst and it is not directly responsive to changes in the actual composition of the raw materials. And while the general process can produce satisfactory results where the raw mix is batch mixed or where the raw materials are of unusually uniform composition, it is unsuitable for the newer large capacity plants which utilize a constant kiln feed with reduced retention time in the kiln because of pre-calcination. In these newer plants, composition uniformity is a greater factor as variations in the composition more substantially affect the quality of the final product.

Various automated processes have been developed which compare the actual compositions of the raw mix with a target composition, and adjust the proportions of the raw materials being mixed to compensate for deviations from the target composition. See U.S. Pat. Nos. 3,233,073 to L. E. Veo et al.; 3,835,873 to Wildpaner; and 3,602,488 to Romig. The automated systems which have been developed, however, do not provide for the periodic indirect adjustment of the estimated chemical compositions of the raw materials being mixed; their initiation procedures include direct analysis of the limestone; and the systems do not incorporate weighfeeder malfunction detection in the automated material proportioning aspect of their process.

SUMMARY OF THE INVENTION

The present invention relates to a process for the production of cement raw mix which takes into account variations which may occur in the raw materials being introduced into the raw mix, particularly such variations which occur in the limestone. Certain embodiments of the invention include the periodic adjustment in the estimated chemical composition of the raw materials used to produce the raw mix in response to the degree of divergence between the actual proportions ($W_i$) of the raw materials mixed and the "theoretical" proportions ($T_i$) which theoretically would have generated the raw mix that was produced over the previous time interval. Based upon the revised estimated chemical compositions, the desired characteristics of the raw mix over the next specific subsequent interval are reselected to adjust the overall chemical composition of the raw mix towards the overall desired characteristics, while maintaining continuity in the raw mix being produced and avoiding undersirable fluctuations in the composition. Briefly described, one embodiment of the present invention includes the steps of:

(1) estimating the chemical composition of the limestone and the several other materials which are to produce the raw mix;

(2) selecting the desired characteristics of the overall raw mix composition;

(3) determining the relative proportions ($W_i$) of the raw material to produce the raw mix of the desired characteristics;

(4) producing raw mix for a time interval by mixing the materials in the determined relative proportions ($W_i$);

(5) after producing the raw mix for a time interval, directly analyzing the chemical composition of the raw mix and calculating the actual characteristics of the raw mix produced;

(6) determining the theoretical relative proportions ($T_i$) of the raw materials that would have theoretically produced the actual characteristics of the raw mix;

(7) adjusting the estimated chemical compositions of the limestone and several other raw materials by adjusting estimated components of the raw materials in response to the degree of divergence between the theoretical relative proportions ($T_i$) and the actual relative proportions ($W_i$) of the raw materials mixed; and (8) based upon the revised estimated chemical compositions of the limestone and several other raw materials, determining relative proportions ($W_i$) of the raw materials to produce raw mix having desired characteristics over the next subsequent interval.

Certain further embodiments provide for indirect analysis of the chemical compositions of the limestone at the initiation of the mixing process by "backtracking" into the limestone, and provide for the detection of weighfeeder malfunctions as a part of the periodic chemical composition adjustment process.

Another aspect of the production of a quality cement product is the adjustment of the desired characteristics of the raw mix between subsequent time intervals to compensate toward the overall desired characteristics in the mix. While correction toward the overall desired characteristics is, of course, desirable, both overcorrection and undercorrection are to be avoided. The correction must be sufficient to compensate for deficiencies in the raw mix already produced. On the other hand, a certain extent of continuity should be maintained as rapid fluctuations in composition will affect the quality of the product. In the newer, larger capacity cement plants, which utilize constant kiln feed and precalcination, fluctuations in the mix significantly affect the quality of the product. The present invention also relates to this adjustment of subsequent target compositions to correct toward the overall desired characteristics in the mix, while maintaining continuity in the chemical compositions of the raw mix being produced.

Wherefore, it is an object of the present invention to produce cement raw mix having desired, uniform composition.

It is a further object of the present invention to produce such a cement raw mix without utilizing regular direct analysis of the raw materials, and particularly without direct analysis of the composition of the limestone.

It is a further object of the invention to provide a process for producing cement raw mix which indirectly takes into account variations in the chemical composition of the raw materials being used to produce the raw mix, and is also sensitive to faulty conditions in the weighfeeders which introduce the ram materials.

It is a further object of the present invention to selectively adjust the desired characteristics of the raw mix over specific subsequent intervals to correct the overall chemical composition of the raw mix towards the overall desired characteristics, while maintaining continuity in the composition of the raw mix being produced and avoiding undesirable fluctuations in the composition.

These and other objects and advantages of the present apparent from a reading of the following specification.

DESCRIPTION OF THE PREFERRED EMBODIMENTS

Figure 1:
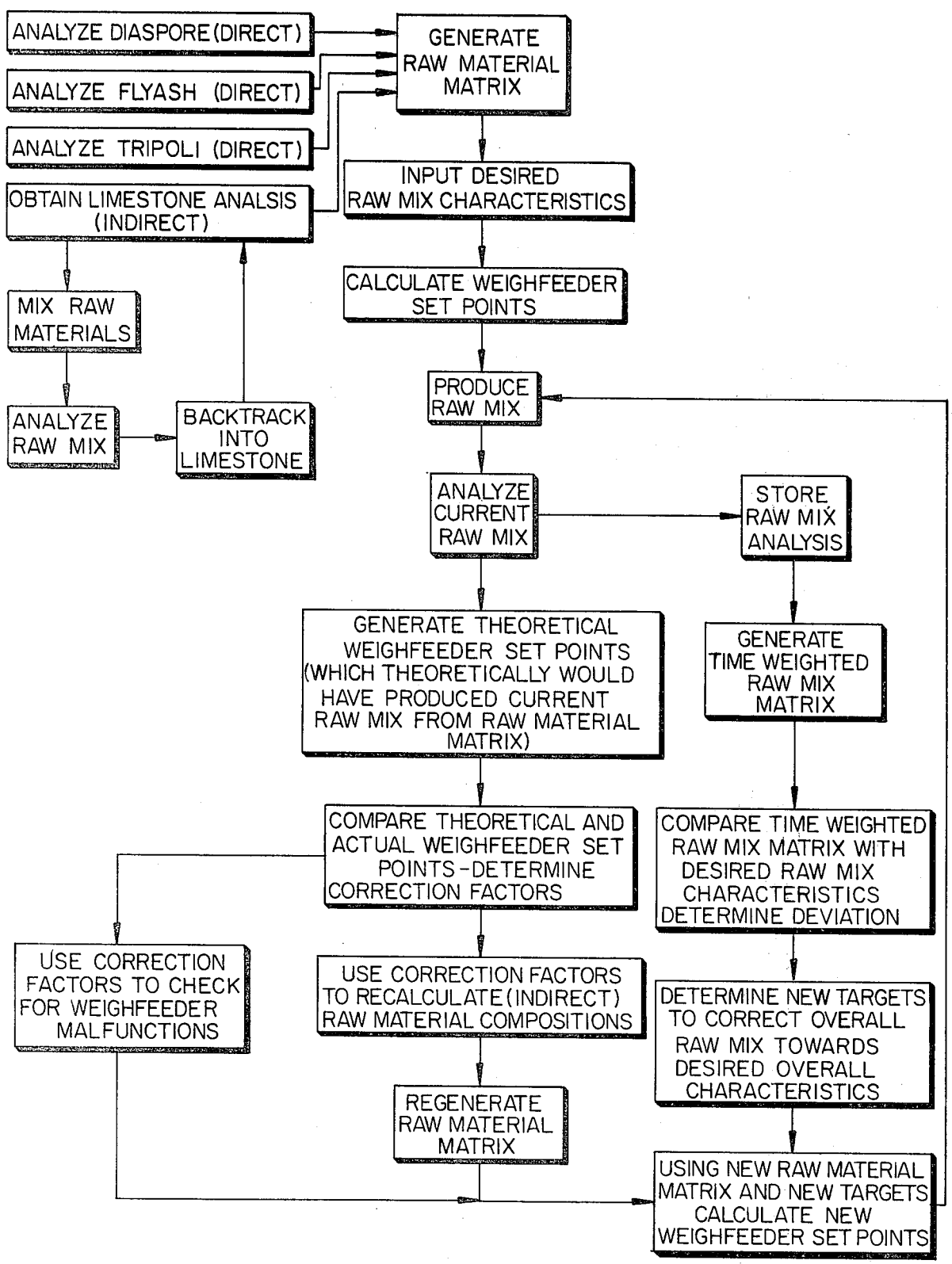
FIG. 1 is a block diagram schematically illustrating a process for the manufacture of cement raw mix.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In the following specification of the preferred embodiment, reference will be made to the mixture of limestone with the raw materials diaspore, tripoli, and fly ash. While these materials are representative of a suitable mixture to produce a cement raw mix, it should be clearly understood that the principles of this same invention may also be applied to the mixture of limestone with other appropriate raw materials for manufacturing cement raw mix.

Figure 2:
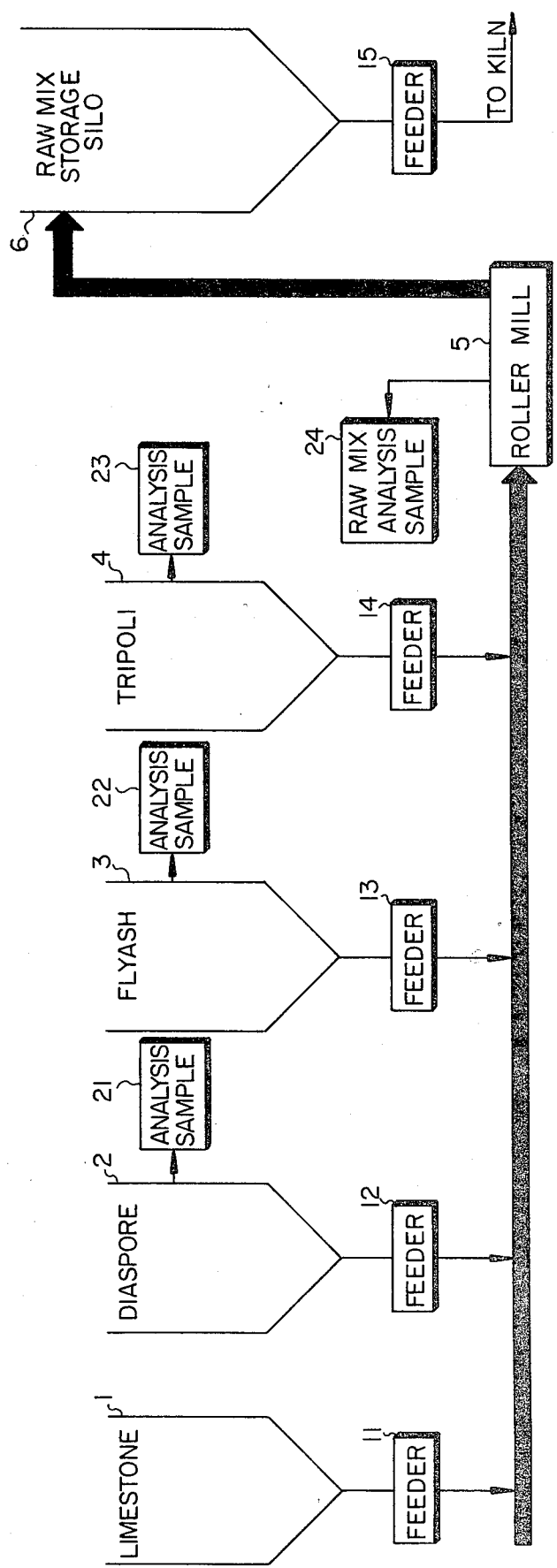
FIG. 2 is a flow chart of the mixture of raw materials to produce a raw mix for feeding into a kiln to undergo the calcination process.

FIG. 2 generally illustrates the manner in which several raw materials are mixed to form a cement raw mix and then fed into a kiln. Storage bins 1, 2, 3, and 4 contain the raw materials limestone (source of calcium oxide, diaspore (source of alumina oxide), flyash (source of iron oxide), and tripoli (source of silica oxide) respectively. The introduction of these raw materials into roller mill 5 are controlled by weighfeeders 11, 12, 13, and 14. In roller mill 5, the raw materials are ground and blended. The blended mixture of raw materials is typically referred to as "raw mix". The raw mix is then stored in silo 6. Weighfeeder 15 controls the feed of raw mix into the kiln where the mix undergoes a calcination process. Also provided are sampling means 21, 22, and 23 for taking analysis samples of diaspore, flyash, and tripoli for the direct chemical analysis of these materials, and sampling means 24 for taking the direct chemical analysis of the blended raw mix.

The preferred embodiments of the present invention will now be described. Before the manufacture of the cement raw mix is initiated, the diaspore, tripoli, and fly ash are directly analyzed to determine their chemical compositions. Limestone, however, is not readily susceptible to direct analysis that would be an accurate representation of the chemical composition of the stone. This is because of the variability of the chemical composition within the stone, variations in the amount of overburden mixed with the stone, changes in the moisture content in the stone, and the shear large quantities of the stone being mixed to produce the raw mix. Instead of directly analyzing the limestone, the chemical composition of the limestone is indirectly determined by "backtracking" into the stone at the initiation of the mixing process. This is done in the following manner:

The chemical compositions of diaspore, tripoli, and fly ash are directly analyzed. The following is an example of the results which might be obtained from this analysis:

TABLE I

| Raw Material Analysis - Direct (Percent) | | | |
|---|---|---|---|
| Element | Diaspore | Tripoli | Flyash |
| $SiO_2$ | 43.783 | 80.97 | 39.17 |
| $Al_2O_3$ | 32.156 | 1.84 | 17.27 |
| $Fe_2O_3$ | 2.904 | 1.635 | 34.29 |
| CaO | 0.0 | 1.52 | 4.40 |
| MgO | 0.322 | 0 | 0.56 |
| $SO_3$ | 0.001 | 0 | 0.86 |
| $K_2O$ | 0.687 | 0.103 | 1.60 |
| $H_2O$ | 6.8 | 9.18 | 0.2 |
| LOI (loss of ignition) | 13.2 | 4.9 | 1.24 |

The raw materials are then mixed in relative proportions ($P_i$) to form cement raw mix over a period of two hours. For instance, the following tonages of each raw material may be mixed within the two hour period:

TABLE II

| Raw Materials Mixed | |
|---|---|
| Limestone | 416.27 tons |
| Tripoli | 34.97 tons |
| Diaspore | .26 tons |
| Flyash | 39.45 tons |

After the two hour period, the chemical composition of the raw mix is obtained by directly analyzing a sample of the raw mix. The results of such direct analysis may be as follows:

TABLE III

| Raw Mix Composition (Percent) | |
|---|---|
| $SiO_2$ | 14.984 |
| $Al_2O_3$ | 3.041 |
| CaO | 1.374 |
| MgO | 2.43 |
| $SO_3$ | .31 |
| $K_2O$ | .178 |
| $H_2O$ | — |
| LOI | — |

This information is then used to "backtrack" into the limestone composition. For instance, the calcium oxide content of the limestone can be calculated by taking the total calcium oxide contained in the raw mix and subtracting from the amounts of calcium oxide contributed by each of the other raw materials. By then dividing this result by the total amount of limestone, the estimated calcium oxide content in the limestone is obtained. The same calculations are performed for the other elements contained in the limestone to obtain an overall indirect chemical composition analysis. From the above data, (Tables I, II, and III) the following indirect analysis of the limestone is obtained:

TABLE IV

| Estimated Limestone Composition (Indirect) | |
|---|---|
| Element | Stone |
| $SiO_2$ | 5.68 |
| $Al_2O_3$ | 0.67 |
| $Fe_2O_3$ | 0.0 |
| CaO | 49.1 |
| MgO | 3.01 |
| $SO_3$ | .29 |
| $K_2O$ | .03 |
| $H_2O$ | 0.0 |
| LOI | 41.2 |

Appendix A is a computer program which, based upon: (1) an initial direct analysis of the other raw materials, (2) mixed porportions of those raw materials with the limestone, and (3) direct analysis of the resulting raw mix, indirectly estimates the chemical composition of the limestone by "backtracking" into the stone as above described. The resulting indirect estimate of the chemical composition of the limestone provides an accurate representation of the content of the limestone that is being fed into the raw mix. Unlike direct analysis, the above described "backtracking" method takes into account variations which occur in the chemical content of the limestone over the course of time as the limestone is fed into the raw mix. Furthermore, the time and expense involved in taking direct analysis of the limestone is saved.

In the process of manufacturing cement raw mix, the specific desired chemical composition selected for any given raw mix will depend upon the particular desired characteristics in the cement final product. The chemical characteristics of the raw mix may be defined by various control moduli. The specific control moduli which are used in the preferred embodiment of the present invention are: (1) lime saturation factor (LSF); (2) silica ratio (SR); and (3) aluminum to iron ratio (AIR). These moduli are represented by the following formulas:

$$\frac{100 \times CaO}{2.8 \times SiO_2 + 1.65 \times Al_2O_3 + .35 \times Fe_2O_3} = LSF$$

$$\frac{SiO_2}{Al_2O_3 + Fe_2O_3} = SR$$

$$\frac{Al_2O_3}{Fe_2O_3} = AIR$$

By selecting a desired lime saturation factor ($LSF_D$), a desired silica ratio ($SR_D$), and a desired aluminum to iron ratio ($AIR_D$), the parameters of the ideal raw mix can thus be defined. By these standards, or targets, the actual characteristics ($LSF_A$, $SR_A$, and $AIR_A$) can be compared, and subsequent adjustments in proportions of raw materials mixed can be made so that the actual characteristics ($LSF_A$, $SR_A$, and $AIR_A$) will more nearly approximate the target characteristics ($LSF_D$, $SR_D$, and $AIR_D$).

In the preferred embodiment, the raw material proportioning adjustments are made on the basis of adjustments of estimated chemical compositions of the raw materials. Those adjustments are based upon the degree or extent of divergence between the actual relative proportions of the raw materials mixed, and theoretically would have produced the raw mix that actually was produced.

The following illustration shows the manner in which these adjustments are made according to the preferred embodiment. The following targets may be selected as desired characteristics in a raw mix to be produced:

TABLE V

| Desired Raw Mix Characteristics | | |
|---|---|---|
| LSF | = | 94.0 |
| SR | = | 3.30 |
| AIR | = | 1.65 |

After the desired characteristics are selected, the relative proportions of the raw materials to be mixed to produce raw mix having those desired characteristics may be calculated. These relative proportions are represented by weighfeeder setpoints ($W_i$) for each of the raw materials. The relative weighfeeder setpoints ($W_i$) are calculated by simulatneously solving the following set of equations:

$$\Sigma W_i = 1$$

$$\frac{100 \times \Sigma(C_iW_i)}{2.8 \times \Sigma(S_iW_i) + 1.65 \times \Sigma(A_iW_i) + .35 \times \Sigma(F_iW_i)} = LSF_D$$

$$\frac{\Sigma S_iW_i}{\Sigma A_iW_i + \Sigma F_iW_i} = SR_D$$

$$\frac{\Sigma A_iW_i}{\Sigma F_iW_i} = AIR_D$$

In the above equations, C represents calcium oxide, A represents aluminum oxide, S represents silica oxide, and F represents iron oxide. Accordingly, $C_i$, $A_i$, $S_i$, and $F_i$ represent the presence of these components in each of the raw materials being mixed. The above equations can be readily solved by Gaussian reduction techniques for the weighfeeder setpoints ($W_i$) for each of the raw materials to produce a cement raw mix having the desired characteristics ($LSF_D$, $SR_D$, and $AIR_D$). Appendix B is a computer program which provides a specific example of computerized Gaussian reduction techniques to simultaneously solve the above equations for weighfeeder setpoints ($W_i$).

Thus, given the desired raw mix characteristics in Table V, and the estimated raw material analysis of Table VI

TABLE VI

| | Raw Material Analysis (Percent) | | | |
|---|---|---|---|---|
| Element | Stone | Diaspore | Tripoli | Flyash |
| SiO2 | 5.07 | 43.78 | 77.51 | 45.03 |
| Al2O3 | 1.23 | 32.16 | 2.80 | 18.36 |
| Fe2O3 | 0.31 | 2.90 | 0.81 | 18.57 |
| CaO | 49.13 | 0.0 | 0 | 5.95 |
| MgO | 1.84 | 0.32 | 0.18 | 0.42 |
| SO3 | 0.11 | 0.0 | 0.1 | 1.09 |
| K2O | 0.1 | 0.69 | 0.01 | 1.81 |
| H2O | 1.5 | 6.80 | 17.0 | 0 |
| LOI | 41.0 | 13.20 | 1.81 | 8.77 |
| C.F. (correction factor) | 0 | 0 | 0 | 0 |
| Totals | 100.29 | 99.85 | 100.22 | 100.00 | the following equations are solved:

$$\Sigma W_i = 1$$

$$\frac{100 \times \Sigma C_iW_i}{2.8 \times \Sigma(S_iW_i) + 1.65 \times \Sigma(A_iW_i) + .35 \times \Sigma(F_iW_i)} = 94.0$$

$$\frac{\Sigma S_iW_i}{\Sigma A_iW_i + \Sigma F_iW_i} = 3.30$$

$$\frac{\Sigma A_iW_i}{\Sigma F_iW_i} = 1.65$$

to generate the following realtive porportions of the raw materials, or weighfeeder setpoints ($W_i$) to produce a raw mix of the desired characteristics.

Table VII

| Raw Material | Weighfeeder Setpoint ($W_i$) |
|---|---|
| Limestone | 80.8% |
| Diaspore | 2.4% |
| Tripoli | 10.3% |

Table VII-continued

| Raw Material | Weighfeeder Setpoint ($W_i$) |
|---|---|
| Flyash | 6.5% |

After producing raw mix by mixing raw materials in relative proportions ($W_i$) over a period of time, for instance two hours, the chemical composition of the raw mix produced is directly analyzed and its actual characteristics ($LSF_A$, $SR_A$, and $AIR_A$) are determined. The next step is to determine the "theoretical" weighfeeder setpoints ($T_i$), i.e. the weighfeeder setpoints which, based upon the estimated chemical compositions of the raw materials, would theoretically have generated the analyzed chemical composition in the raw mix that actually was produced. These theoretical weighfeeder setpoints ($T_i$) can be determined by simulataneously solving the following sets of equations:

$$\Sigma T_i = 1$$

$$\frac{100 \times \Sigma(C_iT_i)}{2.8 \times \Sigma(S_iT_i) + 1.65 \times \Sigma(A_iT_i) + .35 \times \Sigma(F_iT_i)} = LSF_A$$

$$\frac{\Sigma A_iT_i}{\Sigma A_iT_i + \Sigma F_iT_i} = SR_A$$

$$\frac{\Sigma A_iT_i}{\Sigma F_iT_i} = AIR_A$$

The above equations are solvable through Gaussian reduction techniques in the same manner that the actual weighfeeder setpoints ($W_i$) were previously determined. Thus, the raw mix having the following characteristic:

TABLE VIII

| Raw Mix Charateristics | |
|---|---|
| LSF = | 93.98 |
| SR = | 3.33 |
| AIR = | 1.61 | was generated by combining raw materials in the relative proportions given in Table VII.

The theoretical weighfeeder setpoints ($T_i$) are next determined through Gaussian Reduction technique, as hereinabove described. Based upon the estimated raw material analysis of Table VI, the following equations were then solved for $T_i$:

$$\Sigma T_i = 1$$

$$\frac{100 \times \Sigma(C_iT_i)}{2.8 \times \Sigma(S_iT_i) + 1.65 \times \Sigma(A_iT_i) + .35 \times \Sigma(F_iT_i)} = 93.98$$

$$\frac{\Sigma A_iT_i}{\Sigma A_iT_i + \Sigma F_iT_i} = 3.33$$

$$\frac{\Sigma A_iT_i}{\Sigma F_iT_i} = 1.61$$

resulting in the following theoretical realtive proportions of the raw materials or theoretical weighfeeder set points:

TABLE IX

| Raw Material | Theoretical Weighfeeder Setpoints ($T_i$) |
|---|---|
| Limestone | 82.0% |
| Diaspore | 1.7% |
| Tripoli | 11.4% |

TABLE IX-continued

| Raw Material | Theoretical Weighfeeder Setpoints ($T_i$) |
|---|---|
| Flyash | 4.8% |

These theoretical weighfeeder setpoints ($T_i$) represent the relative proportions of raw materials which theoretically would have produced the raw mix that actually was produced, assuming the chemical analysis of Table VI to be accurate and assuming there to be no malfunction in the weighfeeder apparatus.

The next step is to adjust the estimated chemical compositions of the raw materials being mixed, based upon the degree of divergence between the above theoretical weighfeeder setpoints ($T_i$) and the actual weighfeeder setpoints ($W_i$) that were used in the previous time interval.

The estimated chemical compositions can be adjusted in response to the degree or extent of divergence between $T_i$ and $W_i$ by a variety of specific techniques. In the preferred technique, correction factors are calculated for each raw material by the following formula:

$$CF = \frac{W_i - T_i}{W_i} \times 100$$

By applying this formula to the data from Tables VII and IX, the following correction factors result:

TABLE X

| Correction Factors | |
|---|---|
| Limestone: | −1.49 |
| Diaspore: | −10.67 |
| Tripoli: | 27.22 |
| Flyash: | 25.44 |

The correction factors in Table X are used to indirectly correct the raw material analysis to compensate for changes occurring in the composition of the raw materials being introduced into the raw mix. This is achieved by including the correction factors as phantom components of the raw materials and then normalizing each raw material analysis to 1. The following table shows a new revised material analysis, adjusted from the data of Table VI by including the correction factors in Table X, and subsequent normalizing each raw material analysis to 1:

TABLE XI

| | Revised Raw Material Analysis (Percent) | | | |
|---|---|---|---|---|
| Element | Stone | Diaspore | Tripoli | Flyash |
| $SiO_2$ | 5.13 | 49.1 | 60.82 | 35.9 |
| $Al_2O_3$ | 1.24 | 36.1 | 2.2 | 14.6 |
| $Fe_2O_3$ | .31 | 3.3 | .64 | 14.8 |
| CaO | 49.7 | 0 | 0 | 4.7 |
| MgO | 1.86 | .36 | .14 | .33 |
| $SO_3$ | .11 | 0 | .08 | .87 |
| $K_2O$ | .1 | .78 | .01 | 1.44 |
| $H_2O$ | 1.51 | .76 | 13.3 | 0 |
| LOI | 41.51 | 14..8 | 1.42 | 7.0 |
| C F (correction factor) | −1.61 | −12.0 | 21.36 | 20.3 |
| Totals | 99.86 | 100.04 | 99.96 | 99.94 |

Appendix B includes a computer program which adjusts estimated components and normalizes the adjusted analysis to produce a new revised chemical analysis of the raw material. In this manner the chemical compositions of the raw materials are regularly updated to account for variations without the need for regular direct analysis of the raw materials. This is particularly helpful in the estimation of the limestone which is not readily susceptible to accurate direct analysis and is also subject to wide variations in its chemical content during the raw mix manufacturing process. This process is also useful in detecting weighfeeder malfunctions.

As above mentioned, alternative techniques may be employed which also adjust the analyses of the materials in response to the degree of divergence between $T_i$ and $W_i$. For instance, instead of including the correction factors in the subsequent normalization steps, normalization may be performed in a manner that excludes the correction factors. By this process, the components (excluding the phantom correction factor component) for each raw material are normalized to a number which is one plus the correction factor rather than being normalized to one with the correction factor included. Using the correction factors of Table X on the Analysis of Table VI, the following revised analysis is obtained.

TABLE XII

| | Revised Raw Material Analysis (Percent) | | | |
|---|---|---|---|---|
| Element | Stone | Diaspore | Tripoli | Flyash |
| $SiO_2$ | 5.15 | 48.5 | 56.4 | 33.6 |
| $Al_2O_3$ | 1.24 | 35.6 | 2.0 | 13.7 |
| $Fe_2O_3$ | .31 | 3.2 | .59 | 13.8 |
| CaO | 49.8 | 0 | 0 | 4.4 |
| MgO | 1.87 | .35 | .13 | .31 |
| $SO_3$ | .11 | 0 | .07 | .81 |
| $K_2O$ | .1 | .76 | .01 | 1.35 |
| $H_2O$ | 1.52 | 7.5 | 12.4 | 0 |
| LOI | 41.6 | 14.6 | 1.32 | 6.54 |
| C.F. | −1.49 | −10.67 | 27.22 | 25.44 |
| TOTALS | 100.09 | 99.92 | 100.13 | 99.95 |

By another alternative, the estimated components for each raw material are multiplied by the ratio $T_i/W_i$ to adjust for the degree of divergence between the theoretical and actual proportions being fed into the raw matrix. Adjusting the Analysis of Table VI by the $T_i/W_i$ ratios derived from Tables VII and IX, generates the same revised Analysis as is shown in Table XII for the first alternative technique described.

Thus there are alternative techniques to the preferred embodiment which are also responsive to the degree of divergence between $T_i$ and $W_i$. Additionally, each component of each raw material need not be adjusted in order to obtain some of the benefits of the present invention. For instance, with the specific control moduli used in the preferred embodiment (LSF, SR and AIR), it is more significant to adjust the components which are factored into the control moduli (calcium oxide, alumina oxide, silica oxide, and ferric oxide) than the other components which do not affect the moduli and thus do not affect the monitored characteristics of the raw mix. Additionally, where there is uniformity as to certain of the components in the raw materials being mixed, then the remaining, fluctuating components may be singly adjusted.

It should also be noted that while the revised chemical analyses provide accurate representations of the chemical composition of the raw materials in total, and provide a reliable basis for the adjusted proportioning of the mixture of the raw materials, they are not necessarily individually accurate for each individual raw material. Thus a raw material such as diaspore, which is uniformly constant, will nonetheless be subject to adjustments in its "estimated" analysis. Such adjustments, while not representative of changes in the chemical composition of the diaspore are implicitly taking into account variations in the chemical compositions of the other raw materials which affect the quantity of diaspore that need be introduced. Thus, in the above provided example, the adjustment of the diaspore may be generally described as taking into account variations in silica oxide and alumina oxide occurring in the other raw materials, notably the limestone and the tripoli. The adjustment, while not accurately representing a variation in the chemical compositon of the diaspore, is reliable for the purpose of proportioning the introduction of the several raw materials to mix the desired relative quantities of silica oxide and alumina oxide.

tion in the overall raw mix at any one time. Thus, a "Raw Mix Matrix" is used to approximate the overall chemical composition in the raw mix. In the preferred embodiment, such a "Raw Mix Matrix" includes the previous seven raw mix analyses and a weight factor for each analysis (100 for the most recent analysis, then 100, 96, 87, 71, 71, 50 and 26 respectively for the next six previous analyses). These last seven analyses are used to generate a weighted average of the estimated chemical composition of the overall raw mix. From the weighted average, weighted estimations of the overall characteristics ($LSF_A$, $SR_A$, and $AIR_A$) are determined. For example, the following time weighted raw mix matrix in Table XIV generates the overall characteristics of Table VIII.

TABLE XIV

| Time Weighted Raw Mix Matrix | | | | | | | |
|---|---|---|---|---|---|---|---|
| SILICA | 16.13 | 14.01 | 14.33 | 14.51 | 14.37 | 14.63 | 14.21 |
| ALUMINA | 2.80 | 2.61 | 2.68 | 2.71 | 2.71 | 2.76 | 2.75 |
| IRON | 1.76 | 1.83 | 1.70 | 1.56 | 1.49 | 1.64 | 1.63 |
| CALCIUM | 41.40 | 43.60 | 43.30 | 43.39 | 43.48 | 43.12 | 43.42 |
| TONS | 292.90 | 510.31 | 356.10 | 416.72 | 385.20 | 654.79 | 418.50 |
| W FACT | 100.00 | 100.00 | 96.00 | 87.00 | 71.00 | 50.00 | 26.00 |

The preferred embodiment is also useful in the detection of weighfeeder malfunctions by comparing the correction factors with maximum allowable corrections. In the preferred embodiment, the following maximum correction factors are used:

TABLE XIII

| Maximum Corrections - Weighfeeder Malfunction Detection | |
|---|---|
| Limestone | ±5% |
| Diaspore | ±50% |
| Tripoli | ±20% |
| Flyash | ±30% |

In the event that a correction factor exceeds the maximum correction for that raw material, then a weighfeeder malfunction is indicated. For instance, a correction of 35% for flyash exceeds the maximum allowed correction for flyash. The detection of this occurrance indicates a faulty weighfeeder condition, such as the feeder opening becoming occluded. In response to this indication, the faulty condition can be checked out and corrected, thus further mixing under the faulty condition is prevented.

Once the raw material analysis has been indirectly adjusted to account for variations in the chemical content of the raw materials being introduced, the next step is to compare the chemical analysis of the raw mix most recently produced with the overall desired chemical composition of the raw mix and to determine the adjustment that should be made in the target figures over the next period to most nearly approximate the overall desired chemical compositions in the overall raw mix. Overcompensation is to be avoided, as it may result in undersirable fluctuations in the chemical compositions in the raw mix. On the other hand, under compensation will fail to correct for the inaccuracy of the prior off-target mixing periods.

In making the adjustments in the targets for the next subsequent period, use is made of a "Raw Mix Matrix". Because of the large quantities of materials entering the raw mix bin, the large quantity leaving the bin to enter the kiln, and the adjustments being made in the proportions of raw materials being mixed, as well as the chemical changes in the raw materials themselves, it is difficult to precisely estimate the overall chemical composi- The overall actual characteristics ($LSF_A$, $SR_A$, and $AIR_A$) are compared with the overall target characteristics (LSF, SR, and AIR) to determine the deviation of the actual composition from the desired overall composition, and, based upon the deviation, new targets for the next subsequent period are determined. The new targets correct the overall actual composition of the raw mix toward the overall desired composition, while maintaining continuity in the mix and avoiding abrupt fluctuations.

In the preferred embodiment, the following formula is used to determine the new targets ($Ch_D$ for subsequent period) based upon the deviation between the actual composition ($Ch_A$) and the desired overall composition (Ch):

$$Ch_D = Ch + \sin\left(\frac{(Ch - Ch_A)}{M}\right) \times M$$

In the above formula, M is a selected constant which represents the maximum allowable correction. In the preferred embodiment, the following maximum corrections (M) are used.

TABLE XV

| Maximum Corrections (M) | |
|---|---|
|  | M |
| LSF | 4.0% |
| SR | .3% |
| AIR | .3% |

In this manner, a decreasing proportionate adjustment is provided, as the deviation increases, until the maximum allowed adjustment is reached. Further deviations are corrected by the maximum allowed adjustment. Correction is achieved, continuity in the raw mix composition is maintained, and undesirable fluctuations due to overcorrection are avoided. Such overcorrections may otherwise tend to occur, for instance, where there is a temporary abbreviation in the chemical composition in one of the materials.

Thus, by applying the above described method of target adjustment to the overall actual compositions given in Table VIII and the overall desired compositions given in Table V, the following new targets are obtained:

TABLE XV

| New Targets (Ch$_D$) | |
|---|---|
| LSF | 94.02 |
| SR | 3.27 |
| AIR | 1.69 |

Due to the relative small deviations in the example provided, the non linear nature of the target adjustment in the preferred embodiment is not apparent from Table XVI. Table XVII illustrates the decreasing proportionate nature in correction over a range of possible actual compositions, given the desired overall LSF to be 94.0%.

TABLE XVII

| Actual Composition (LSF$_A$) | New Target (LSF$_D$) | Deviation (LSF$_A$ − LSF) | Correction (LSF$_D$ − LSF) |
|---|---|---|---|
| 84.0 | 98.00 | −10.0 | 4.0 |
| 86.0 | 98.00 | −8.0 | 4.0 |
| 88.0 | 97.99 | −6.0 | 3.99 |
| 90.0 | 97.37 | −4.0 | 3.37 |
| 92.0 | 95.92 | −2.0 | 1.92 |
| 94.0 | 94.00 | .0 | .0 |
| 96.0 | 92.08 | 2.0 | −1.92 |
| 98.0 | 90.63 | 4.0 | −3.37 |
| 100.0 | 90.01 | 6.0 | −3.99 |
| 102.0 | 90.00 | 8.0 | −4.0 |
| 104.0 | 90.00 | 10.0 | −4.0 |

Finally, new weighfeeder setpoints to be used over the next subsequent period are determined, based upon the new target and the revised raw material compositions. The same Gaussian reduction method is used was was initially described to determine actual weighfeeder setpoints ($W_i$).

Based upon the new targets (Table XV) and the revised estimated chemical compositions (Table XII), the following new weighfeeder setpoints are calculated:

TABLE XVII

| New Weighfeeder Setpoints ($W_i$) | |
|---|---|
| Limestone | 83.2 |
| Diaspore | 2.8 |
| Tripoli | 8.2 |
| Flyash | 5.8 |

Based upon the new weighfeeder setpoints ($W_i$), the hereinabove described steps of producing raw mix in relative proportions $W_i$, analyzing the raw mix produced, determining the theoretical relative proportions, adjusting the estimated chemical compositions in response to the degrees of divergence between $T_i$ and $W_i$, checking for weighfeeder malfunctions, and revising the raw mix targets are reiterated.

Wherefore, while there have been described above the principles of this invention in connection with specific apparatus and techniques, it is to be clearly understood that this description is made only by way of an example and not as a limitation to the scope of the invention.

```
*NEW
*NEW
*LOAD"MCRN31
*LIST
0010 REM MORNING CORRECTION PROGRAM
0020 PRINT "(C) 1981 G+W NATURAL RESOURCES-WRITTEN BY G. EAKER, O. OLLER"
0030 DEF FNI(X)=INT(X*1000+.5)/1000
0040 DIM T$[40],T5$[10],A[40],E[40],D[40],B[4]
0050 DIM K1[9,7],K$[1]
0060 PRINT "SET ENERGY RANGE KEV TO 0-8---SET TIME TO 100 SEC."
0070 PRINT
0080 LET E1=10
0090 DIM P[3,E1+2],I[2,E1],C[2,E1],F$[2*E1+2],F[2*E1,2*E1+1],V[3,3]
0100 LET S4=1
0110 LET J9=1
0120 LET T5$="          "
0130 IF S4=5 THEN GOTO 0210
0140 IF S4>2 THEN GOTO 0180
0150 IF J9=1 THEN LET T5$="TRIP1.CF"
0160 IF J9=2 THEN LET T5$="DIAS1.CF"
0170 GOTO 0230
0180 IF J9=1 THEN LET T5$="RMKF1.CF"
0190 IF J9=2 THEN LET T5$="FLYASH1.CF"
0200 GOTO 0230
0210 LET J9=2
0220 LET T5$="RMKF1.CF"
0230 OPEN FILE[1,3],T5$
0240 INPUT FILE[1],T$[1,40],E1,E5,L8,T2
0250 LET B[J9]=E1
0260 INPUT FILE[1],F$[1,2*L8]
0270 LET T=0
0280 LET X=E5
0290 LET E4=400
0300 LET E3=20
0310 LET E2=0
0320 FOR J=1 TO L8
```

```
0330     INPUT FILE[1],P[3,J]
0340     LET S1=INT(1000*(P[3,J]-E2)/E3+1.4999)
0350     LET S2=INT(.7*SQR(32400+2735*(P[3,J]-5.894))/E3)
0360     LET P[1,J]=S1-S2
0370     LET P[2,J]=S1+S2
0380 NEXT J
0390 FOR J=1 TO T2
0400     INPUT FILE[1],V[1,J],V[2,J],V[3,J]
0410 NEXT J
0420 FOR J=1 TO E1
0430     FOR K=1 TO 2*E1+1
0440         LET J8=10*(J9-1)+J
0450         INPUT FILE[1],F[J8,K]
0460     NEXT K
0470 NEXT J
0480 CLOSE FILE[1]
0490 PRINT "TITLE: ";T$[1,40]
0500 PRINT
0510 LET J9=J9+1
0520 LET T5$="                "
0530 IF J9<3 THEN GOTO 0120
0540 IF S4>=5 THEN GOTO 1060
0550 IF S4>2 THEN GOTO 0970
0560 PRINT
0570 PRINT
0580 LET L2=1                    Appendix A
0590 LET L4=1
0600 PRINT
0610 PRINT "* INSERT REF *"
0620 PRINT
0630 PRINT "REF STD LABEL";
0640 GOSUB 1770
0650 LET R1=0
0660 LET R5=0
0670 LET R2=0
0680 LET R6=0
0690 LET E1=B[1]
0700 GOSUB 1870
0710 FOR K=1 TO T2
0720     IF V[1,K]<>E1+1 THEN GOTO 0760
0730     ERASE 2440, 3440
0740     ENTER "SUB1"
0750     GOSUB 2440
0760 NEXT K
0770 LET L7=(L8-1)*2
0780 PRINT F$[L7-1,L7];"   I=";R1,
0790 LET L7=L8*2
0800 PRINT F$[L7-1,L7];"   I=";R6
0810 LET R9=R6/R1
0820 IF L4=1 THEN GOTO 0860
0830 LET R4=4*SQR(R1)
0840 IF R1-R4<R3 THEN IF R3<R1+R4 THEN GOTO 0860
0850 PRINT "REF INT CHANGED!!!"
0860 LET J2=1
0870 PRINT
0880 PRINT "TYPE OF SAMPLE: (1)SILICA (2)DIASPORE (3)COEF FILES FOR F.A.,RM"
0890 INPUT S4
0900 IF S4=1 THEN LET Z=2
0910 IF S4=1 THEN LET J9=1
0920 IF S4=2 THEN LET Z=3
0930 IF S4=2 THEN LET J9=2
0940 IF S4=3 THEN GOTO 0110
0950 GOTO 1110
0960 PRINT
0970 PRINT "TYPE OF SAMPLE: (3)FLYASH 1 (4)FLYASH 2 (5)RAWMIX (6)REF";
0980 INPUT S4
0990 IF S4=3 THEN LET Z=5
1000 IF S4=3 THEN LET J9=2
1010 IF S4=4 THEN LET Z=6
```

```
1020 IF S4=4 THEN LET J9=2
1030 IF S4=5 THEN GOTO 0120
1040 IF S4>=6 THEN GOTO 0600
1050 GOTO 1110
1060 PRINT "TYPE OF SAMPLE: (5)RAWMIX (6)REF";
1070 INPUT S4
1080 IF S4=5 THEN LET Z=7
1090 IF S4=5 THEN LET J9=2
1100 IF S4>=6 THEN GOTO 0600
1110 LET E1=B[J9]
1120 PRINT
1121 PRINT
1122 PRINT
1123 PRINT "ANALYSIS PERFORMED ON MACHINE #1"
1124 PRINT
1125 PRINT
1130 PRINT "SAMPLE IDENT.";
1140 GOSUB 1770
1150 FOR J=1 TO E1
1160    LET I[J2,J]=0
1170 NEXT J
1180 IF L2=0 THEN LET R1=1
1190 IF L2=0 THEN LET R6=1
1200 LET R2=1
1210 GOSUB 1870
1220 FOR K=1 TO T2
1230    IF V[1,K]>E1 THEN GOTO 1270
1240    ERASE 2440, 3440
1250    ENTER "SUB1"
1260    GOSUB 2440
1270 NEXT K
1280 FOR J=1 TO E1
1290    LET R7=R1
1300    IF (J-1)*(J-2)*(J-5)*(J-10)=0 THEN LET R7=R6
1310    LET I[J2,J]=I[J2,J]/R7
1320    PRINT F$[J*2-1,J*2];"  I=";I[J2,J]
1330 NEXT J
1340 LET W0=0
1350 FOR J=1 TO E1
1360    LET C1=0
1370    LET J8=10*(J9-1)+J
1380    FOR K=1 TO E1
1390       LET C1=C1+I[1,J]*I[1,K]*F[J8,K]
1400       LET C1=C1+I[1,K]*F[J8,K+E1]
1410    NEXT K
1420    LET C[1,J]=C1+F[J8,2*E1+1]
1430    LET W0=W0+C[1,J]
1440 NEXT J
1450 PRINT "LOSS =";
1460 INPUT W1;
1470 PRINT  TAB(20);"REF. INT.:   CA=";R1;"   SI=";R6
1480 PRINT
1490 FOR J=1 TO E1
1500    PRINT F$[J*2-1,J*2];"  C=";FNI(C[1,J]); TAB(17);
1510    PRINT F$[J*2-1,J*2];"  MFB=";FNI(C[1,J])
1520 NEXT J
1530 PRINT "TOTAL=";W0+W1
1540 PRINT
1550 ERASE 2440, 3440
1560 ENTER "MSUB1"
1570 GOSUB 2440
1580 LET R3=R1
1590 LET L4=2
1600 FOR J=1 TO 7
1610    LET K1[J,Z]=C[1,J]
1620 NEXT J
1630 IF S4<>5 THEN GOTO 1670
1640 ERASE 2440, 3440
1650 ENTER "MSUB2"
1660 GOSUB 2440
1670 PRINT
```

```
1680 PRINT
1690 PRINT
1700 PRINT
1710 PRINT
1720 PRINT
1730 IF S4<3 THEN GOTO 0870
1740 IF S4<5 THEN GOTO 0960
1750 IF S4>=5 THEN GOTO 0100
1760 END
1770 FOR J=1 TO 36 STEP 5
1780    LET T$[J,J+4]="     "
1790 NEXT J
1800 INPUT T$
1810 PRINT
1820 IF T$[1,3]="END" THEN GOTO 1760
1830 IF T$[1,6]<>"REPEAT" THEN GOTO 1860
1840 LET R3=R1
1850 GOTO 0600
1860 RETURN
1870 CALL 1
1880 CALL 3,T
1890 FOR J1=2 TO E4
1900    CALL 3,X
1910    IF R2=0 THEN GOTO 1970
1920    FOR J=1 TO E1
1930       IF J1>=P[1,J] THEN IF J1<=P[2,J] THEN LET I[J2,J]=I[J2,J]+X/T
1940       LET I[2,J]=I[J2,J]
1950    NEXT J
1960    GOTO 1990
1970    IF J1>=P[1,L8-1] THEN IF J1<=P[2,L8-1] THEN LET R1=R1+X/T
1980    IF J1>=P[1,L8] THEN IF J1<=P[2,L8] THEN LET R6=R6+X/T
1990 NEXT J1
2000 CALL 2
2010 RETURN
2020 REM:OVERLAYS START WITH THE NEXT STATEMENT
2440 REM: DUMMY ERASE STATEMENT
2440 REM MORNING SUB 1
2450 REM:COPYRIGHT 1981 G&W NATURAL RESOURCES GROUP--MARQUETTE COMPANY
2460 PRINT "DESIRED TOTAL=";
2470 INPUT T5
2480 PRINT "MOISTURE CONTENT=";
2490 INPUT M1
2500 PRINT
2510 LET R5=R1
2520 LET R8=R6
2530 LET R5=R5-10
2540 LET R8=R8-R9*10
2550 IF T5>=(W0+W1) THEN GOTO 2580
2560 LET R5=R5+20
2570 LET R8=R8+R9*20
2580 FOR J=1 TO E1
2590    LET R7=R5
2600    IF (J-1)*(J-2)*(J-5)*(J-10)=0 THEN LET R7=R8
2610    LET I[J2,J]=I[2,J]/R7
2620 NEXT J
2630 LET W0=0
2640 FOR J=1 TO E1
2650    LET C1=0
2660    LET J8=10*(J9-1)+J
2670    FOR K=1 TO E1
2680       LET C1=C1+I[1,J]*I[1,K]*F[J8,K]
2690       LET C1=C1+I[1,K]*F[J8,K+E1]
2700    NEXT K
2710    LET C[1,J]=C1+F[J8,2*E1+1]
2720    LET W0=W0+C[1,J]
2730 NEXT J
2740 IF (W0+W1)>=T5+.1 THEN GOTO 2530
2750 IF (W0+W1)<=T5-.1 THEN GOTO 2530
2760 PRINT
2770 FOR J=1 TO E1
```

```
2780    PRINT F$[J*2-1,J*2];"    I=";I[J2,J]
2790    LET C[2,J]=C[1,J]
2800 NEXT J
2810 PRINT
2820 PRINT
2830 PRINT
2840 LET A=T5-M1-W1
2850 LET K6=0
2860 FOR J=1 TO 7
2870    LET K6=K6+C[1,J]
2880 NEXT J
2890 LET M3=K6
2900 IF ABS(A-M3)<.1 THEN GOTO 2980
2910 LET M4=A-M3
2920 LET K6=0
2930 FOR J=1 TO 7
2940    LET C[1,J]=C[1,J]*(1+(M4/(M3*2)))
2950    LET K6=K6+C[1,J]
2960 NEXT J
2970 GOTO 2890
2980 FOR J=1 TO E1
2990    PRINT F$[J*2-1,J*2];" C=";FNI(C[2,J]); TAB(17);
3000    PRINT F$[J*2-1,J*2];" ARB=";FNI(C[1,J])
3010 NEXT J
3020 PRINT "LOSS=";W1;"    MOISTURE=";M1;"    REF INT.:  CA=";R5;"    SI=";R8
3030 PRINT "TOTAL=";(W0+W1)
3040 IF Z=8 THEN GOTO 3200
3050 PRINT
3070 PRINT "WOULD YOU LIKE TO STORE THIS RAW MAT. ANALLYSIS YES(1) NO(2)"
3080 INPUT X
3090 IF X=2 THEN GOTO 3200
3100 OPEN FILE[2,0],"RAWMAT",252
3110 MAT READ FILE[2,0],K1
3120 FOR J=1 TO 7
3130    LET K1[J,Z]=C[1,J]
3140 NEXT J
3150 LET K1[8,Z]=M1
3160 LET K1[9,Z]=W1
3170 MAT WRITE FILE[2,0],K1
3180 CLOSE FILE[2]
3190 PRINT
3200 PRINT
3210 REM COPYRIGHT (C) 1981 G+W NATURAL RESOURCES GROUP-MARQUETTE COMPANY
3220 RETURN
R
TYPE M.SUB2
2440 REM MORNING CORRECTION SUB 2
2450 REM:COPYRIGHT 1981 G+W NATURAL RESOURCES GROUP-MARQUETTE COMPANY
2460 DIM H[1,7],X4[9,7]
2470 OPEN FILE[2,0],"RAWMAT",252
2480 MAT READ FILE[2,0],K1
2490 CLOSE FILE[2]
2500 MAT X4=K1
2501 PRINT "IF USING FLYASH FEEDER AS A COMBINATION FOR MILLSCALE-FLYASH, "
2502 PRINT "ADD UP THESE TWO TONNAGES AND INPUT THEM AS FLYASH"
2503 PRINT
2504 PRINT
2505 PRINT
2510 PRINT "ENTER TONNAGES IN THE FOLLOWING ORDER;-1-LIMESTONE,-2-DIASPORE"
2511 PRINT "-3-TRIPOLI,-4-MILL SCALE,-5-FLYASH 1,-6-FLYASH 2"
2512 PRINT
2520 FOR J=1 TO 6
2530    INPUT H[1,J]
2540 NEXT J
2550 LET H[1,7]=0
2560 FOR J=1 TO 6
2570    LET H[1,7]=H[1,7]+H[1,J]
2580 NEXT J
2581 LET X=H[1,2]
2582 LET Y=H[1,3]
```

```
2583 LET H[1,2]=Y
2584 LET H[1,3]=X
2590 INPUT "DO YOU WANT TO ENTER THE RAW MATERIAL ANALYSIS? Y OR N  ",K$
2600 IF K$[1]="N" THEN GOTO 2730
2610 LET X=0
2620 PRINT "THE ORDER IN WHICH THE RAW MATERIAL ANALYSIS IS TO BE ENTERED IS:"
2630 PRINT "(1)SILICA (2)DIASPORE (3)MILL SCALE (4)FLYASH 1 (5)FLYASH 2 (6)EXIT"
2640 PRINT "SIO2-AL2O3-FE2O3-CAO-MGO-SO3-K2O-MOISTURE-LOSS"
2650 INPUT "WHICH RAW MATERIAL DO YOU WANT TO ENTER?",X
2660 IF X>=6 THEN GOTO 2850
2670 LET X=X+1
2680 FOR J=1 TO 9
2690    INPUT K1[J,X]
2700    LET X4[J,X]=K1[J,X]
2710 NEXT J
2720 GOTO 2650
2730 LET K1[1,4]=2.48
2740 LET K1[2,4]=2.07
2750 LET K1[3,4]=97.8
2760 LET K1[4,4]=2.04
2770 LET K1[5,4]=.58
2780 LET K1[6,4]=0
2790 LET K1[7,4]=.09
2800 LET K1[8,4]=.75
2810 LET K1[9,4]=-5.81
2820 FOR X=1 TO 9
2830    LET X4[X,4]=K1[X,4]
2840 NEXT X
2850 OPEN FILE[2,0],"RAWMAT",252
2860 MAT WRITE FILE[2,0],K1
2870 CLOSE FILE[2]
2880 FOR Y=1 TO 7
2890    LET K9=0
2900    FOR X=2 TO 6
2910       LET K9=(H[1,X])*(K1[Y,X])+K9
2920    NEXT X
2930    LET K1[Y,1]=(K1[Y,7]*H[1,7]-K9)
2940 NEXT Y
2945 PRINT "INPUT STONE DATA"
2946 PRINT
2950 PRINT "LOSS=";
2960 INPUT W1
2970 LET K1[9,1]=W1
2980 PRINT "MOISTURE= ";
2990 INPUT M1
3000 LET K1[8,1]=M1
3010 PRINT "DESIRED TOTAL= ";
3020 INPUT M2
3030 LET A=(M2-M1-W1)
3040 LET K6=0
3050 FOR J=1 TO 7
3060    LET K1[J,1]=K1[J,1]/H[1,1]
3070    LET K6=K6+K1[J,1]
3080 NEXT J
3090 LET M3=K6
3100 IF ABS(A-M3)<.1 THEN GOTO 3180
3110 LET M4=A-M3
3120 LET K6=0
3130 FOR J=1 TO 7
3140    LET K1[J,1]=K1[J,1]*(1+(M4/(M3*2)))
3150    LET K6=K6+K1[J,1]
3160 NEXT J
3170 GOTO 3090
3180 FOR J=1 TO 9
3190    LET X4[J,1]=K1[J,1]
3200 NEXT J
3210 OPEN FILE[2,0],"RAWMAT",252
3220 MAT WRITE FILE[2,0],K1
3230 CLOSE FILE[2]
3240 PRINT
3250 PRINT
```

```
3260 PRINT "                RAW MATERIAL COMPOSITION MATRIX"
3270 PRINT
3280 PRINT "ELEMENT    STONE     SILICA    DIASP.    MILL SC.   FLYASH 1   FLYASH 2
3290 FOR X=1 TO 9
3300    IF X=1 THEN PRINT ;"SIO2 ";
3310    IF X=2 THEN PRINT ;"AL2O3";
3320    IF X=3 THEN PRINT ;"FE2O3";
3330    IF X=4 THEN PRINT ;"CAO  ";
3340    IF X=5 THEN PRINT ;"MGO  ";
3350    IF X=6 THEN PRINT ;"SO3  ";
3360    IF X=7 THEN PRINT ;"K2O  ";
3370    IF X=8 THEN PRINT ;"H2O  ";
3380    IF X=9 THEN PRINT ;"LOI  ";
3390    FOR Y=1 TO 5
3400       PRINT USING "------.###",X4[X,Y];
3410    NEXT Y
3420    PRINT USING "######.###",X4[X,6]
3430    PRINT
3440 NEXT X
3450 PRINT
3460 PRINT "COPYRIGHT (C) 1981 G+W NATURAL RESOURCES GROUP-MARQUETTE COMPANY"
3470 RETURN
R
LOS_..  ... ...
*LIST
0010 REM WRITTEN BY G. EAKER, O. OLLER
0020 REM MIX DESIGN PROGRAM FOR 4 FEEDERS
0030 REM
0040 DEF FNI(X)=INT(X*1000+.5)/1000
0050 DIM T$[40],T5$[13],A[40],E[40],D[40],B[2]
0060 DIM X2[6,7],X4[10,8],X5[6],X6[6,7],K1[9,7],K$[1]
0065 LET T9=1
0070 PRINT
0080 PRINT "(C) 1981 G+W NATURAL RESOURCES-WRITTEN BY G. EAKER,O. OLLER"
0090 PRINT
0100 LET E1=10
0110 DIM P[3,E1+2],I[2,E1],C[2,E1],F$[2*E1+4],F[2*E1,2*E1+1],V[3,2]
0120 PRINT
0130 LET J9=1
0140 LET T5$="             "
0150 IF J9=1 THEN LET T5$="RMKF1.CF"
0160 IF J9=2 THEN LET T5$="CEMCL1.CF"
0170 OPEN FILE[1,3],T5$
0180 INPUT FILE[1],T$[1,40],E1,E5,L8,T2
0190 LET B[J9]=E1
0200 INPUT FILE[1],F$[1,2*L8]
0210 LET T=0
0220 LET X=E5
0230 LET E4=400
0240 LET E3=20
0250 LET E2=0
0260 FOR J=1 TO L8
0270    INPUT FILE[1],P[3,J]
0280    LET S1=INT(1000*(P[3,J]-E2)/E3+1.4999)
0290    LET S2=INT(.7*SQR(32400+2735*(P[3,J]-5.894))/E3)
0300    LET P[1,J]=S1-S2
0310    LET P[2,J]=S1+S2
0320 NEXT J
0330 FOR J=1 TO T2
0340    INPUT FILE[1],V[1,J],V[2,J],V[3,J]
0350 NEXT J
0360 FOR J=1 TO E1
0370    FOR K=1 TO 2*E1+1
0380       LET J8=10*(J9-1)+J
0390       INPUT FILE[1],F[J8,K]
0400    NEXT K
0410 NEXT J
0420 CLOSE FILE[1]
0430 PRINT "TITLE: ";T$[1,40]
0440 PRINT
```

```
0450 GOTO 0780
0460 PRINT "ELEMENT=";E1
0470 PRINT "ELEMENT KEV & SYMBOL:"
0480 FOR J=1 TO L8
0490    IF J=E1+1 THEN PRINT "REF ELEM:"
0500    PRINT J; TAB(6);P[3,J]; TAB(17);F$[J*2-1,J*2]
0510 NEXT J
0520 PRINT
0530 PRINT "COEFFICIENTS:"
0540 PRINT
0550 LET O8=1
0560 LET O9=E1
0570 IF J9=1 THEN GOTO 0600
0580 LET O8=11
0590 LET O9=E1+10
0600 FOR J=O8 TO O9
0610    FOR K=1 TO E1
0620       PRINT F[J,K];
0630    NEXT K
0640    PRINT
0650    FOR K=E1+1 TO 2*E1+1
0660       PRINT F[J,K];
0670    NEXT K
0680    PRINT
0690    PRINT
0700 NEXT J
0710 PRINT
0720 IF T2=0 THEN GOTO 0780
0730 PRINT "OVERFLOW PEAKS=";T2
0740 PRINT "ELEM NO & OVERFLOW RANGE (CH #):"
0750 FOR J=1 TO T2
0760    PRINT V[1,J];" FROM";V[2,J]; TAB(15);" TO";V[3,J]
0770 NEXT J
0780 PRINT
0790 LET J9=J9+1
0800 LET T5$="               "
0810 IF J9<3 THEN GOTO 0140
0820 PRINT
0830 PRINT
0840 LET L2=1
0850 LET L4=1
0860 PRINT
0870 PRINT "* INSERT REF *"
0880 PRINT
0890 PRINT "REF STD LABEL";
0900 GOSUB 2180
0910 LET R1=0
0920 LET R5=0
0930 LET R2=0
0940 LET R6=0
0950 LET E1=B[2]
0960 GOSUB 2280
0970 FOR K=1 TO T2
0980    IF V[1,K]<>E1+1 THEN GOTO 1020
0990    ERASE 2440, 3840
1000    ENTER "SUB1"
1010    GOSUB 2440
1020 NEXT K
1030 LET L7=(L8-1)*2
1040 PRINT F$[L7-1,L7];"  I=";R1,
1050 LET L7=L8*2
1060 PRINT F$[L7-1,L7];"  I=";R6
1070 LET R9=R6/R1
1080 IF L4=1 THEN GOTO 1120
1090 LET R4=4*SQR(R1)
1100 IF R1-R4<R3 THEN IF R3<R1+R4 THEN GOTO 1120
1110 PRINT "REF INT. CHANGED!!!"
1120 LET J2=1
1130 PRINT
1140 PRINT "TYPE OF SAMPLE (1)RM (2)KF (3)CEM (4)CL (5)REF";
1150 INPUT Z
```

Appendix B

```
1160 IF Z<=2 THEN LET J9=1
1170 IF Z>=3 THEN LET J9=2
1180 IF Z>=5 THEN GOTO 0360
1190 LET E1=B[J9]
1200 PRINT
1201 PRINT
1202 PRINT
1203 PRINT "ANALYSIS PERFORMED ON MACHINE #1"
1204 PRINT "TIME ";SYS(11);":";SYS(12)
1205 PRINT
1210 PRINT "SAMPLE IDENT.";
1220 GOSUB 2180
1230 FOR J=1 TO E1
1240    LET I[J2,J]=0
1250 NEXT J
1260 IF L2=0 THEN LET R1=1
1270 IF L2=0 THEN LET R6=1
1280 LET R2=1
1290 GOSUB 2280
1300 FOR K=1 TO T2
1310    IF V[1,K]>E1 THEN GOTO 1350
1320    ERASE 2440, 3840
1330    ENTER "SUB1"
1340    GOSUB 2440
1350 NEXT K
1360 FOR J=1 TO E1
1370    LET R7=R1
1380    IF (J-1)*(J-2)*(J-5)*(J-10)=0 THEN LET R7=R6
1390    LET I[J2,J]=I[J2,J]/R7
1400    IF Z>=3 THEN GOTO 1420
1410    PRINT F$[J*2-1,J*2];"  I=";I[J2,J]
1420 NEXT J
1430 LET W0=0
1440 FOR J=1 TO E1
1450    LET C1=0
1460    LET J8=10*(J9-1)+J
1470    FOR K=1 TO E1
1480       LET C1=C1+I[1,J]*I[1,K]*F[J8,K]
1490       LET C1=C1+I[1,K]*F[J8,K+E1]
1500    NEXT K
1510    LET C[1,J]=C1+F[J8,2*E1+1]
1520    LET W0=W0+C[1,J]
1530 NEXT J
1540 IF Z>=3 THEN LET C[1,2]=C[1,2]+C[1,8]+C[1,10]
1550 PRINT "LOSS =";
1560 INPUT W1;
1570 PRINT  TAB(20);"REF. INT.:    CA=";R1;"   SI=";R6
1580 PRINT
1590 FOR J=1 TO E1
1600    LET C[2,J]=C[1,J]
1610    IF Z<=2 THEN GOTO 1650
1620    PRINT F$[J*2-1,J*2];"  C=";FNI(C[1,J]); TAB(17);
1630    PRINT F$[J*2-1,J*2];"  I=";I[J2,J]
1640    IF Z>=3 THEN GOTO 1680
1650    PRINT F$[J*2-1,J*2];"  C=";FNI(C[1,J]); TAB(17);
1660    LET C[1,J]=C[1,J]*100/(100-W1)
1670    PRINT F$[J*2-1,J*2];"  LFC=";FNI(C[1,J])
1680 NEXT J
1690 PRINT "TOTAL=";W0+W1
1700 IF Z>=3 THEN GOTO 1730
1710 LET W2=4.071*C[1,4]-7.6*C[1,1]-6.718*C[1,2]-1.43*C[1,3]
1720 GOTO 1750
1730 LET W2=4.071*C[1,4]-7.6*C[1,1]-6.718*C[1,2]
1740 LET W2=W2-1.43*C[1,3]-2.852*C[1,6]
1750 LET W3=2.867*C[1,1]-.7544*W2
1760 LET W4=2.65*C[1,2]-1.692*C[1,3]
1770 LET W5=3.043*C[1,3]
1780 LET W6=C[1,1]/(C[1,2]+C[1,3])
1790 LET W7=(C[1,4]/(2.0*C[1,1]+1.65*C[1,2]+.35*C[1,3]))*100
1800 LET W8=C[1,2]/C[1,3]
1810 PRINT "C3S =";W3
```

```
1820 PRINT "C2S  =";W3
1830 PRINT "C3A  =";W4
1840 PRINT "C4AF =";W5
1850 PRINT "SR   =";W6
1860 PRINT "AL/FE=";W8
1870 PRINT "LSF  =";W7
1880 PRINT
1890 FOR J=1 TO E1
1900    LET C[1,J]=C[2,J]
1910 NEXT J
1920 INPUT "DO YOU WANT DATA NORMALIZED? Y OR N  ",K$
1930 IF K$[1]="N" THEN GOTO 1970
1940 ERASE 2440, 4500
1950 ENTER "SUB2"
1960 GOSUB 2440
1970 LET R3=R1
1980 LET L4=2
1990 IF Z>=2 THEN GOTO 2090
2000 ERASE 2440, 4500
2010 ENTER "SUB3"
2020 GOSUB 2440
2030 ERASE 2440, 4500
2040 ENTER "SUB4"
2050 GOSUB 2440
2060 ERASE 2440, 4500
2070 ENTER "SUB5"
2080 GOSUB 2440
2090 PRINT
2100 PRINT
2110 PRINT
2120 PRINT
2130 PRINT
2140 PRINT
2150 PRINT
2160 GOTO 1120
2170 END
2180 FOR J=1 TO 36 STEP 5
2190    LET T$[J,J+4]="     "
2200 NEXT J
2210 INPUT T$
2220 PRINT
2230 IF T$[1,3]="END" THEN GOTO 2170
2240 IF T$[1,6]<>"REPEAT" THEN GOTO 2270
2250 LET R3=R1
2260 GOTO 0860
2270 RETURN
2280 CALL 1
2290 CALL 3,T
2300 FOR J1=2 TO E4
2310    CALL 3,X
2320    IF R2=0 THEN GOTO 2380
2330    FOR J=1 TO E1
2340       IF J1>=P[1,J] THEN IF J1<=P[2,J] THEN LET I[J2,J]=I[J2,J]+X/T
2350       LET I[2,J]=I[J2,J]
2360    NEXT J
2370    GOTO 2400
2380    IF J1>=P[1,L8-1] THEN IF J1<=P[2,L8-1] THEN LET R1=R1+X/T
2390    IF J1>=P[1,L8] THEN IF J1<=P[2,L8] THEN LET R6=R6+X/T
2400 NEXT J1
2410 CALL 2
2420 RETURN
2430 REM OVERLAYS START NEXT STATEMENT
2440 REM SUB1
2450 REM:COPYRIGHT 1981 G+W NATURAL RESOURCES GROUP-MARQUETTE COMPANY
2460 LET V1=V[1,K]
2470 LET V2=V[2,K]
2480 LET V3=V[3,K]
2490 LET I8=INT((V2+V3)/2)
2500 CALL 1
2510 FOR J=1 TO I8+19
2520    CALL 3,X
```

```
2530    IF J<I8-20 THEN GOTO 2550
2540    LET D[J-I8+21]=X
2550 NEXT J
2560 CALL 2
2570 LET S1=21+V2-I8
2580 LET S2=S1+V3-V2
2590 FOR J=S1 TO S2
2600    LET L=J-S1+1
2610    LET A[L]=D[J]
2620 NEXT J
2630 FOR J=1 TO L-1
2640    LET E[J]=A[J+1]-A[J]
2650 NEXT J
2660 FOR J=2 TO L-1
2670    LET I4=2*E[J]-E[J-1]
2680    LET I5=E[J+1]-I4
2690    IF ABS(I5)>ABS(I4) THEN GOTO 2710
2700 NEXT J
2710 LET I6=J+2
2720 LET J=L-1
2730 LET J=J-1
2740 LET I4=2*E[J]-E[J+1]
2750 LET I5=E[J-1]-I4
2760 IF ABS(I5)>ABS(I4) THEN GOTO 2780
2770 IF J>2 THEN GOTO 2730
2780 LET I7=J-1
2790 IF I7<I6 THEN GOTO 2890
2800 IF I7=I6 THEN GOTO 2860
2810 LET J=I6-1
2820 LET J=J+1
2830 LET A[J]=A[J]+65536
2840 IF J<I7 THEN GOTO 2820
2850 GOTO 2630
2860 LET I9=(A[I6-1]+A[I6+1])/2
2870 IF A[I6]>I9-20*SQR(I9) THEN GOTO 2890
2880 LET A[I6]=A[I6]+65536
2890 FOR J=S1 TO S2
2900    LET D[J]=A[J-S1+1]
2910 NEXT J
2920 IF R2=0 THEN LET R1=0
2930 IF R2=1 THEN LET I[J2,V1]=0
2940 LET S1=21+P[1,V1]-I8
2950 LET S2=S1+P[2,V1]-P[1,V1]
2960 FOR J=S1 TO S2
2970    IF R2=0 THEN LET R1=R1+D[J]/T
2980    IF R2=1 THEN LET I[J2,V1]=I[J2,V1]+D[J]/T
2990 NEXT J
3000 IF R2=1 THEN LET I[2,V1]=I[J2,V1]
3010 RETURN
R
TYPE CUB2
2440 REM CUB2
2450 REM:COPYRIGHT 1981 G+W NATURAL RESOURCES GROUP-MARQUETTE COMPANY
2460 PRINT "DESIRED TOTAL=";
2470 INPUT T5
2480 PRINT
2490 LET R5=R1
2500 LET R8=R6
2510 LET R5=R5-10
2520 LET R8=R8-R9*10
2530 IF T5>=W0+W1 THEN GOTO 2560
2540 LET R5=R5+20
2550 LET R8=R8+R9*20
2560 FOR J=1 TO E1
2570    LET R7=R5
2580    IF (J-1)*(J-2)*(J-5)*(J-10)=0 THEN LET R7=R8
2590    LET I[J2,J]=I[2,J]/R7
2600 NEXT J
2610 LET W0=0
2620 FOR J=1 TO E1
2630    LET C1=0
```

```
2640    LET J8=10*(J9-1)+J
2650    FOR K=1 TO E1
2660       LET C1=C1+I[1,J]*I[1,K]*F[J8,K]
2670       LET C1=C1+I[1,K]*F[J8,K+E1]
2680    NEXT K
2690    LET C[1,J]=C1+F[J8,2*E1+1]
2700    LET W0=W0+C[1,J]
2710 NEXT J
2720 IF W0+W1>=T5+.1 THEN GOTO 2510
2730 IF W0+W1<=T5-.1 THEN GOTO 2510
2740 PRINT
2750 IF Z>=3 THEN LET C[1,2]=C[1,2]+C[1,8]+C[1,10]
2760 IF Z>=3 THEN GOTO 2800
2770 FOR J=1 TO E1
2780    PRINT F$[J*2-1,J*2];"    I=";I[J2,J]
2790 NEXT J
2800 PRINT
2810 FOR J=1 TO E1
2820    LET C[2,J]=C[1,J]
2830    IF Z<=2 THEN GOTO 2870
2840    PRINT F$[J*2-1,J*2];"   C=";FNI(C[1,J]); TAB(17);
2850    PRINT F$[J*2-1,J*2];"   I=";I[J2,J]
2860    IF Z>=3 THEN GOTO 2900
2870    PRINT F$[J*2-1,J*2];"   C=";FNI(C[1,J]); TAB(17);
2880    LET C[1,J]=C[1,J]*100/(100-W1)
2890    PRINT F$[J*2-1,J*2];" LFC=";FNI(C[1,J])
2900 NEXT J
2910 PRINT "LOSS=";W1;"    REF. INT.:   CA=";R5;"   SI=";R8
2920 PRINT "TOTAL=";W0+W1
2930 IF Z>=3 THEN GOTO 2960
2940 LET W2=4.071*C[1,4]-7.6*C[1,1]-6.718*C[1,2]-1.43*C[1,3]
2950 GOTO 2980
2960 LET W2=4.071*C[1,4]-7.6*C[1,1]-6.718*C[1,2]
2970 LET W2=W2-1.43*C[1,3]-2.852*C[1,6]
2980 LET W3=2.867*C[1,1]-.7544*W2
2990 LET W4=2.65*C[1,2]-1.692*C[1,3]
3000 LET W5=3.043*C[1,3]
3010 LET W6=C[1,1]/(C[1,2]+C[1,3])
3020 LET W7=(C[1,4]/(2.8*C[1,1]+1.65*C[1,2]+.35*C[1,3]))*100
3030 LET W8=C[1,2]/C[1,3]
3040 PRINT "C3S =";W2
3050 PRINT "C2S =";W3
3060 PRINT "C3A =";W4
3070 PRINT "C4AF=";W5
3080 PRINT "SR  =";W6
3090 PRINT "A/FE=";W8
3100 PRINT "LSF =";W7
3110 FOR J=1 TO E1
3120    LET C[1,J]=C[2,J]
3130 NEXT J
3140 RETURN
R

2440 REM SUB3
2450 REM:COPYRIGHT 1981 GTW NATURAL RESOURCES GROUP-MARQUETTE COMPANY
2460 IF T9=1 THEN GOTO 2600
2470 PRINT
2480 INPUT "IS THIS THE FIRST RAW MIX SAMPLE? Y OR N    ",K$
2490 PRINT
2500 IF K$[1]="N" THEN GOTO 2600
2510 PRINT
2520 INPUT "WOULD YOU LIKE TO ZERO OUT THE RAW MIX MAT? Y OR N    ",K$
2530 PRINT
2540 IF K$[1]="N" THEN GOTO 2600
2550 MAT X2=ZER
2560 OPEN FILE[1,0],"RAWMIX",192
2570 MAT WRITE FILE[1,0],X2
2580 CLOSE FILE[1]
2590 GOTO 2630
2600 OPEN FILE[1,0],"RAWMIX",192
2610 MAT READ FILE[1,0],X2
```

```
2620 CLOSE FILE[1]
2630 LET X2[6,1]=100
2640 LET X2[6,2]=100
2650 LET X2[6,3]=96
2660 LET X2[6,4]=87
2670 LET X2[6,5]=71
2680 LET X2[6,6]=50
2685 LET X2[6,7]=26
2690 IF T9=1 THEN GOTO 2760
2700 INPUT "DO YOU WANT TO CHANGE YOUR TARGETS? Y OR N   ",K$
2710 IF K$[1]="N" THEN GOTO 2760
2720 INPUT "S.R   =",X5[4]
2730 INPUT "A/FE  =",X5[5]
2740 INPUT "L.S.F.=",X5[6]
2750 GOTO 2810
2760 ERASE 2780, 2800
2770 ENTER "SUB7"
2780 REM
2790 REM
2800 REM
2810 FOR N=1 TO 6
2820    LET X1=8-N
2830    LET X=7-N
2840    FOR Y=1 TO 5
2850       LET X2[Y,X1]=X2[Y,X]
2860    NEXT Y
2870 NEXT N
2880 IF T9=1 THEN GOTO 2970
2890 INPUT "WOULD YOU LIKE TO ENTER THE WET ANALYSIS? Y OR N   ",K$
2900 IF K$[1]="N" THEN GOTO 2970
2910 FOR Y=1 TO 4
2920    PRINT "INPUT C";
2930    INPUT C[1,Y]
2940    LET X2[Y,1]=C[1,Y]
2950 NEXT Y
2960 GOTO 3000
2970 FOR J=1 TO 4
2980    LET X2[J,1]=C[1,J]
2990 NEXT J
3000 PRINT
3010 PRINT "SWITCH TO EPTAK--TYPE -SAMPLE AT XX.XX- THEN HIT RETURN"
3020 STOP
3030 INPUT "WOULD YOU LIKE TO ENTER THE WEIGHFEEDER TONNAGES? Y OR N   ",K$
3040 PRINT
3050 IF K$[1]="N" THEN GOTO 3130
3060 PRINT
3070 PRINT "ENTER TONNAGES IN THE FOLLOWING ORDER;-1-LIMESTONE,-2-DIASPORE"
3080 PRINT "-3- TRIPOLI,-4-MILL SCALE,-5-FLYASH 1,-6-FLYASH 2"
3090 PRINT
3100 FOR J=1 TO 6
3110    INPUT X4[10,J]
3120 NEXT J
3130 LET X2[5,1]=0
3140 FOR J=1 TO 6
3150    LET X2[5,1]=X2[5,1]+X4[10,J]
3160 NEXT J
3170 PRINT
3180 LET X=X4[10,2]
3190 LET Y=X4[10,3]
3200 LET X4[10,2]=Y
3210 LET X4[10,3]=X
3220 PRINT
3230 PRINT "                    #####MIXING POT ANALYSIS#####"
3240 FOR X=1 TO 6
3250    IF X=1 THEN PRINT ;"SILICA ";
3260    IF X=2 THEN PRINT ;"ALUMINA";
3270    IF X=3 THEN PRINT ;"IRON   ";
3280    IF X=4 THEN PRINT ;"CALCIUM";
3290    IF X=5 THEN PRINT ;"TONS   ";
3300    IF X=6 THEN PRINT ;"W.FACT.";
```

```
3310    FOR Y=1 TO 6
3320       PRINT USING "------.##",X2[X,Y];
3330    NEXT Y
3340    PRINT USING "######.##",X2[X,7]
3350 NEXT X
3360 PRINT
3370 PRINT
3380 OPEN FILE[1,0],"RAWMIX",192
3390 MAT WRITE FILE[1,0],X2
3400 CLOSE FILE[1]
3410 PRINT
3420 PRINT "OF THESE THREE FEEDERS"
3430 PRINT "(4) MILL SCALE (R=34)"
3440 PRINT "(5) FLYASH 1   (R-33-01)"
3450 PRINT "(6) FLYASH 2   (R-32-02)"
3460 PRINT "WHICH ONE HAS A VARIABLE SETPOINT  ";
3470 INPUT X3
3480 LET X4[10,X3]=X4[10,X3]+X4[10,4]
3490 OPEN FILE[2,0],"RAWMAT"
3500 MAT READ FILE[2,0],K1
3510 CLOSE FILE[2]
3520 FOR J=1 TO 9
3530    FOR X=1 TO 6
3540       LET X4[J,X]=K1[J,X]
3550    NEXT X
3560 NEXT J
3570 LET J1=7
3580 FOR J=4 TO 6
3590    IF J=X3 THEN GOTO 3650
3600    FOR X=1 TO 10
3610       LET X4[X,J1]=X4[X,J]
3620       LET X4[X,J]=0
3630    NEXT X
3640    LET J1=J1+1
3650 NEXT J
3660 REM REARRANGE RAW MATERIAL MATRIX
3670 LET J1=0
3680 FOR J=1 TO 6
3690    IF X4[10,J]=0 THEN GOTO 3740
3700    LET J1=J1+1
3710    FOR X=1 TO 10
3720       LET X4[X,J1]=X4[X,J]
3730    NEXT X
3740 NEXT J
3750 FOR J=1 TO 7
3760    FOR X=1 TO 6
3770       LET X6[X,J]=X2[X,J]
3780    NEXT X
3790 NEXT J
3800 LET X2[5,7]=0
3810 LET X2[6,7]=0
3820 FOR J=1 TO 6
3830    FOR X=1 TO 4
3840       LET X2[X,J]=X2[X,J]*X2[5,J]*X2[6,J]
3850    NEXT X
3860    LET X2[6,7]=X2[6,7]+X2[5,J]*X2[6,J]
3870    LET X2[5,7]=X2[5,7]+X2[5,J]
3880 NEXT J
3890 REM: MUST NOW DETERMINE TARGET AVERAGES OF LAST 6 HOURS
3900 FOR J=1 TO 4
3910    LET X2[J,7]=0
3920    FOR X=1 TO 6
3930       LET X2[J,7]=X2[J,7]+X2[J,X]
3940    NEXT X
3950    LET X2[J,7]=(X2[J,7])/X2[6,7]
3960 NEXT J
3970 REM: CALCULATE NEW TARGETS
3980 LET X5[1]=X2[1,7]/(X2[2,7]+X2[3,7])
3990 LET X5[2]=X2[2,7]/X2[3,7]
4000 LET X5[3]=(X2[4,7]/(2.8*X2[1,7]+1.65*X2[2,7]+.35*X2[3,7]))*100
4010 PRINT
4020 PRINT
```

```
4030 PRINT "THESE ARE AVERAGES FOR LAST SIX HOURS"
4040 PRINT ;"  SR     =";
4050 PRINT USING "####.##",X5[1]
4060 PRINT ;"A/FE   =";
4070 PRINT USING "####.##",X5[2]
4080 PRINT ;"L.S.F. =";
4090 PRINT USING "####.##",X5[3]
4100 PRINT
4110 PRINT "THESE ARE YOUR TARGET SETPOINTS"
4120 PRINT ;"  SR     =";
4130 PRINT USING "####.##",X5[4]
4140 PRINT ;"A/FE   =";
4150 PRINT USING "####.##",X5[5]
4160 PRINT ;"L.S.F. =";
4170 PRINT USING "####.##",X5[6]
4180 PRINT
4190 PRINT
4200 RETURN
R
TYPE 2064
2440 REM: SUB4
2450 REM:COPYRIGHT 1981 G+W NATURAL RESOURCES GROUP-MARQUETTE COMPANY
2460 REM: CALCULATE THE COEFF. FOR THE GAUSS SOL. SUB.
2470 LET V4=X2[2,1]/X2[3,1]
2480 LET V5=X2[1,1]/(X2[2,1]+X2[3,1])
2490 LET V6=100*X2[4,1]/(2.8*X2[1,1]+1.65*X2[2,1]+.35*X2[3,1])
2500 MAT X2=ZER
2510 MAT A=ZER
2520 LET X2[1,J1+1]=1
2530 FOR X=1 TO J1
2540    LET X2[1,X]=1
2550    LET X2[2,X]=(X4[3,X]*V4)-X4[2,X]
2560    LET X2[2,J1+1]=0
2570    IF J1<3 THEN GOTO 2630
2580    LET X2[3,X]=V5*(X4[2,X]+X4[3,X])-X4[1,X]
2590    LET X2[3,J1+1]=0
2600    IF J1<4 THEN GOTO 2630
2610    LET X2[4,X]=V6*((X4[1,X]*2.8)+(X4[2,X]*1.65)+(X4[3,X]*.35))-X4[4,X]*100
2620    LET X2[4,J1+1]=0
2630 NEXT X
2640 REM: GAUSS SUBROUTINE
2650 IF J1<4 THEN GOTO 2670
2660 LET N2=4
2670 LET N1=J1
2680 LET N2=J1+1
2690 FOR K=1 TO N1-1
2700    LET N9=K+1
2710    LET N8=0
2720    FOR K1=K TO N1
2730       LET N6=0
2740       FOR K2=K TO N2-1
2750          LET N5=ABS(X2[K1,K2])
2760          IF N5<N6 THEN GOTO 2780
2770          LET N6=N5
2780       NEXT K2
2790       IF ABS(X2[K1,K])<.000001 THEN GOTO 2810
2800       GOTO 2820
2810       IF N6<=.000001 THEN GOTO 3180
2820       LET N7=ABS(X2[K1,K])/N6
2830       IF N7-N8>=0 THEN GOTO 2860
2840    NEXT K1
2850    GOTO 2890
2860    LET N3=K1
2870    LET N8=N7
2880 NEXT K1
2890 IF N3=K THEN GOTO 2950
2900 FOR J=K TO N2
2910    LET N4=X2[K,J]
2920    LET X2[K,J]=X2[N3,J]
2930    LET X2[N3,J]=N4
2940 NEXT J
```

```
2950 FOR J=N9 TO N2
2960    LET X2[K,J]=X2[K,J]/X2[K,K]
2970    FOR I=N9 TO N1
2980       LET X2[I,J]=X2[I,J]-X2[K,J]*X2[I,K]
2990    NEXT I
3000 NEXT J
3010 LET X2[K,K]=1
3020 FOR I=N9 TO N1
3030    LET X2[I,K]=0
3040 NEXT I
3050 NEXT K
3060 IF ABS(X2[N1,N1])<.000001 THEN GOTO 3180
3070 LET A[N1]=X2[N1,N2]/X2[N1,N1]
3080 FOR I2=1 TO N1-1
3090    LET M3=0
3100    LET I=N1-I2
3110    LET I1=I+1
3120    FOR J=I1 TO N1
3130       LET M3=M3+X2[I,J]*A[J]
3140    NEXT J
3150    LET A[I]=X2[I,N2]-M3
3160 NEXT I2
3170 GOTO 3190
3180 LET N1=N1-1
3190 REM: NOW THE PROGRAM DETERMINES IF FEEDER STARVED
3200 PRINT ;"THEOR. LIMESTONE :";
3210 PRINT USING "#####.#",A[1]*100
3220 PRINT ;"THEOR. DIASPORE  :";
3230 PRINT USING "#####.#",A[3]*100
3240 PRINT ;"THEOR. TRIPOLI   :";
3250 PRINT USING "#####.#",A[2]*100
3260 PRINT ;"THEOR. VAR. FEED.:";
3270 PRINT USING "#####.#",A[4]*100
3280 PRINT
3290 PRINT
3300 FOR Y=1 TO J1
3315    LET X=X4[10,Y]/X6[5,1]
3316    LET M6=(X-A[Y])*(100/X)
3320    LET A[Y]=M6
3330 NEXT Y
3340 PRINT ;"HUMIDITY FACTOR (LIMESTONE)  :   ";
3350 PRINT USING "+####.##",A[1]
3360 PRINT ;"HUMIDITY FACTOR (DIASPORE)   :   ";
3370 PRINT USING "+####.##",A[3]
3380 PRINT ;"HUMIDITY FACTOR (TRIPOLI)    :   ";
3390 PRINT USING "+####.##",A[2]
3400 PRINT ;"HUMIDITY FACTOR (VAR. FEEDER):   ";
3410 PRINT USING "+####.##",A[4]
3420 IF A[1]>15 THEN LET A[1]=15
3425 IF A[1]<-15 THEN LET A[1]=-15
3430 IF A[2]>30 THEN LET A[2]=30
3435 IF A[2]<-30 THEN LET A[2]=-30
3440 IF A[3]>50 THEN LET A[3]=50
3445 IF A[3]<-50 THEN LET A[3]=-50
3450 IF A[4]>30 THEN LET A[4]=30
3455 IF A[4]<-30 THEN LET A[4]=-30
3460 REM: MUST NOW NORMALIZE NEW RAW MATERIAL ANALYSE
3470 FOR J=1 TO J1
3480    LET M1=100
3490    LET M3=0
3500    FOR Y=1 TO 9
3510       LET M3=M3+X4[Y,J]
3520    NEXT Y
3530    LET M3=M3+A[J]
3540    IF ABS(M1-M3)<.1 THEN GOTO 3630
3550    LET M4=M1-M3
3560    LET K6=0
3570    FOR Y=1 TO 9
3580       LET X4[Y,J]=X4[Y,J]*(1+(M4/(M3*2)))
3590       LET K6=K6+X4[Y,J]
3600    NEXT Y
```

```
3610    LET M3=K6+A[J]*(1+(M4/(M3*2)))
3620      GOTO 3540
3630 NEXT J
3640 REM: WE HAVE GENERATED A NEW RAW MATERIAL MATRIX CORRECTED FOR H.F.
3650 RETURN
R
TYPE SUBS
2440 REM SUBS
2450 REM:COPYRIGHT 1981 G+W NATURAL RESOURCES GROUP-MARQUETTE COMPANY
2460 LET V1=.3
2470 LET V2=.3
2480 LET V3=4
2490 IF X5[4]-X5[1]>V1 THEN LET V4=X5[4]+V1
2500 IF X5[1]-X5[4]>V1 THEN LET V4=X5[4]-V1
2510 IF ABS(X5[4]-X5[1])>V1 THEN GOTO 2540
2520 LET X=(X5[4]-X5[1])/V1
2530 LET V4=X5[4]+(SIN(X*90*3.14159/180))*V1
2540 IF X5[5]-X5[2]>V2 THEN LET V5=X5[5]+V2
2550 IF X5[2]-X5[5]>V2 THEN LET V5=X5[5]-V2
2560 IF ABS(X5[5]-X5[2])>V2 THEN GOTO 2590
2570 LET X=(X5[5]-X5[2])/V2
2580 LET V5=X5[5]+(SIN(X*90*3.14159/180))*V2
2590 IF X5[6]-X5[3]>V3 THEN LET V6=X5[6]+V3
2600 IF X5[3]-X5[6]>V3 THEN LET V6=X5[6]-V3
2610 IF ABS(X5[6]-X5[3])>V3 THEN GOTO 2640
2620 LET X=(X5[6]-X5[3])/V3
2630 LET V6=X5[6]+(SIN(X*90*3.14159/180))*V3
2640 MAT X2=ZER
2650 MAT A=ZER
2660 LET X2[1,J1+1]=1
2670 FOR X=1 TO J1
2680    LET X2[1,X]=1
2690    LET X2[2,X]=(X4[3,X]*V5)-X4[2,X]
2700    LET X2[2,J1+1]=0
2710    IF J1<3 THEN GOTO 2770
2720    LET X2[3,X]=V4*(X4[2,X]+X4[3,X])-X4[1,X]
2730    LET X2[3,J1+1]=0
2740    IF J1<4 THEN GOTO 2770
2750    LET X2[4,X]=V6*((X4[1,X]*2.8)+(X4[2,X]*1.65)+(X4[3,X]*.35))-X4[4,X]*100
2760    LET X2[4,J1+1]=0
2770 NEXT X
2780 REM: GAUSS SUBROUTINE
2790 IF J1<4 THEN GOTO 2810
2800 LET N2=4
2810 LET N1=J1
2820 LET N2=J1+1
2830 FOR K=1 TO N1-1
2840    LET N9=K+1
2850    LET N8=0
2860    FOR K1=K TO N1
2870       LET N6=0
2880       FOR K2=K TO N2-1
2890          LET N5=ABS(X2[K1,K2])
2900          IF N5<N6 THEN GOTO 2920
2910          LET N6=N5
2920       NEXT K2
2930       IF ABS(X2[K1,K])<.000001 THEN GOTO 2950
2940       GOTO 2960
2950       IF N6<=.000001 THEN GOTO 3320
2960       LET N7=ABS(X2[K1,K])/N6
2970       IF N7-N8>=0 THEN GOTO 3000
2980    NEXT K1
2990    GOTO 3030
3000    LET N3=K1
3010    LET N8=N7
3020 NEXT K1
3030 IF N3=K THEN GOTO 3090
3040 FOR J=K TO N2
3050    LET N4=X2[K,J]
```

```
3060      LET X2[I,..        ...
3070      LET X[N3,J] U4
3080 NEXT J
3090 FOR J=N9 TO N2
3100     LET X2[K,J]=X2[K,J]/X2[K,K]
3110     FOR I=N9 TO N1
3120        LET X2[I,J]=X2[I,J]-X2[K,J]*X2[I,K]
3130     NEXT I
3140 NEXT J
3150 LET X2[K,K]=1
3160 FOR I=N9 TO N1
3170     LET X2[I,K]=0
3180 NEXT I
3190 NEXT K
3200 IF ABS(X2[N1,N1])<.000001 THEN GOTO 3320
3210 LET A[N1]=X2[N1,N2]/X2[N1,N1]
3220 FOR I2=1 TO N1-1
3230     LET M3=0
3240     LET I=N1-I2
3250     LET I1=I+1
3260     FOR J=I1 TO N1
3270        LET M3=M3+X2[I,J]*A[J]
3280     NEXT J
3290     LET A[I]=X2[I,N2]-M3
3300 NEXT I2
3310 GOTO 3330
3320 LET N1=N1-1
3330 LET M1=100
3340 FOR J=1 TO 4
3350     LET A[J]=A[J]*100
3360     IF A[J]>.1 THEN GOTO 3390
3370     LET A[J]=.1
3380     LET M1=M1-A[J]
3390 NEXT J
3400 LET M3=0
3410 FOR Y=1 TO J1
3420     LET M3=M3+A[Y]
3430 NEXT Y
3440 IF ABS(M1-M3)<.01 THEN GOTO 3530
3450 LET M4=M1-M3
3460 LET K6=0
3470 FOR Y=1 TO J1
3480     LET A[Y]=A[Y]*(1+(M4/(M3*2)))
3490     LET K6=K6+A[Y]
3500 NEXT Y
3510 LET M3=K6
3520 GOTO 3440
3530 PRINT
3540 PRINT
3550 PRINT "THE WEIGHTFEEDER SETPOINTS ARE AS FOLLOWS"
3560 LET Z=7
3570 FOR J=5 TO 6
3580     FOR X=1 TO 10
3590        LET X4[X,J]=X4[X,Z]
3600     NEXT X
3610     LET Z=Z+1
3620 NEXT J
3630 FOR X=1 TO 4
3640     FOR Y=1 TO 6
3650        LET X4[X,Y]=X4[X,Y]*A[Y]/100
3660     NEXT Y
3670 NEXT X
3680 FOR Y=1 TO 4
3690     LET X2[Y,7]=0
3700     FOR X=1 TO 6
3710        LET X2[Y,7]=X2[Y,7]+X4[Y,X]
3720     NEXT X
3730 NEXT Y
3740 PRINT
3750 LET X5[1]=X2[1,7]/(X2[2,7]+X2[3,7])
3760 LET X5[2]=X2[2,7]/X2[3,7]
```

```
3770 LET X5[3]=100*X2[4,7]/(2.8*X2[1,7]+1.65*X2[2,7]+.35*X2[3,7])
3780 PRINT
3790 LET T=0
3800 ERASE 3820, 3890
3810 ENTER "SUB6"
3820 REM
3830 REM
3840 REM
3850 REM
3860 REM
3870 REM
3880 REM
3890 REM
3900 FOR J=1 TO 6
3910    LET A[J]=(A[J]+.05)*10
3920    LET A[J]=INT(A[J])/10
3930    LET T=T+A[J]
3940 NEXT J
3950 IF T=100 THEN GOTO 4100
3960 IF T<100 THEN GOTO 4010
3970 LET B=T-100
3980 LET A[1]=A[1]-B
3990 LET T=T-B
4000 GOTO 4030
4010 LET B=100-T
4020 LET A[1]=A[1]+B
4030 LET A[1]=(A[1]+.05)*10
4040 LET A[1]=INT(A[1])/10
4050 LET T=T+B
4060 LET T=0
4070 FOR J=1 TO 6
4080    LET T=T+A[J]
4090 NEXT J
4100 PRINT ;"LIMESTONE :";
4110 PRINT USING "####.#",A[1]
4120 PRINT ;"DIASPORE  :";
4130 PRINT USING "####.#",A[3]
4140 PRINT ;"TRIPOLI   :";
4150 PRINT USING "####.#",A[2]
4160 IF X3=4 THEN LET X=4
4170 IF X3=4 THEN LET Y=5
4180 IF X3=4 THEN LET Z=6
4190 IF X3=5 THEN LET X=5
4200 IF X3=5 THEN LET Y=4
4210 IF X3=5 THEN LET Z=6
4220 IF X3=6 THEN LET X=5
4230 IF X3=6 THEN LET Y=6
4240 IF X3=6 THEN LET Z=4
4250 PRINT ;"MILL SCALE:";
4260 PRINT USING "####.#",A[X]
4270 PRINT ;"FLYASH 1  :";
4280 PRINT USING "####.#",A[Y]
4290 PRINT ;"FLYASH 2  :";
4300 PRINT USING "####.#",A[Z]
4310 PRINT
4320 PRINT "TOTAL     =";T
4330 PRINT
4340 PRINT "NEW TARGETS ARE"
4350 PRINT ;"              SR    =";
4360 PRINT USING "#####.##",X5[1]
4370 PRINT ;"              A/FE  =";
4380 PRINT USING "#####.##",X5[2]
4390 PRINT ;"              L.S.F.=";
4400 PRINT USING "#####.##",X5[3]
4410 PRINT
4420 PRINT "SWITCH TO EPTAK AND TYPE IN WEIGHFEEDER SETPOINTS"
4430 STOP
4440 PRINT
4450 PRINT "TIME ";SYS(11);":";SYS(12)
```

```
4460 PRINT
4470 PRINT "COPYRIGHT (C) 1981 G+W NATURAL RESOURCES GROUP-MARQUETTE COMPANY"
4480 LET T9=1
4490 RETURN
R

TYPE SUB6
3820 GOTO 3900
3830 REM THE NEXT 2 LINES ARE FOR USING 2 FLYASHS
3840 LET A[6]=A[4]*.5
3850 LET A[4]=A[4]-A[6]
3860 REM PUT GOTO 3900 FOR 2 FLYASHES HERE,REMOVE LINE 3820
3870 REM NEXT 2 LINE FOR MILLSCALE AND FLYASH
3880 LET A[5]=A[4]*.1
3890 LET A[4]=A[4]-A[5]
R

TYPE SUB7
2780 LET X5[4]=3.3
2790 LET X5[5]=1.6
2800 LET X5[6]=94
R
```

What is claimed:

1. A method for regulating the mixture of limestone with other raw materials to produce a cement raw mix of desired composition, said method comprising the steps of:
   (1) estimating the chemical composition of the limestone and the several other raw materials;
   (2) selecting the desired characteristics (Ch) of the overall raw mix composition;
   (3) determining the relative proportions ($W_i$) of raw material to produce raw mix of the desired characteristics ($Ch_D$);
   (4) producing raw mix for a time interval by mixing raw materials in relative proportions ($W_i$);
   (5) after producing the raw mix for the time interval, directly analyzing the chemical composition of the raw mix and calculating the actual characteristics ($Ch_A$) of the raw mix;
   (6) determining the theoretical relative proportions ($T_i$) of the raw materials that would have theoretically produced the actual characteristics of the raw mix;
   (7) adjusting the estimated chemical compositions of the limestone and the several other raw materials by adjusting estimated components in response to the degree of divergence between $T_i$ and $W_i$ in the limestone and for the several other raw materials;
   (8) reselecting the desired characteristics of the raw mix composition ($Ch_D$) over the next subsequent time interval to adjust the overall raw mix towards the overall desired characteristics (Ch); and
   (9) repeating steps three through eight.

2. The method of claim 1 in which said chemical composition estimating includes the steps of:
   (a) directly analyzing the chemical composition of the several other raw materials;
   (b) producing raw mix by mixing the limestone and the several other raw materials for a time interval in relative proportions ($P_i$):
   (c) directly analyzing the chemical composition of the raw mix produced by said mixing in relative proportions ($P_i$); and
   (d) based upon differences in component presence between the raw mix produced by said mixing in relative porportions ($P_i$) and the combined several other raw materials, estimating the chemical composition of the limestone.

3. The method of claim 1 additionally including the steps of checking for faulty weighfeeder conditions, said checking including sensing the degree of divergence between $T_i$ and $W_i$.

4. The method of claim 3 in which said checking for faulty weighfeeder conditions additionally includes comparing the degree of actual divergence between $T_i$ and $W_i$ for each raw material with selected maximum permissible divergence (non-fault condition) for each raw material, and indicating the possibility of weighfeeder malfunction when the degree of actual divergence for a raw material exceeds the maximum permissible divergence (non-fault condition) for that raw material.

5. The method of claim 1 in which said selecting of new desired characteristics for the next subsequent time period includes selecting of new desired characteristics which compensatingly deviate from the overall desired characteristics in a manner which is decreasingly proportionate with respect to the extent of deviation between the overall desired characteristics and the actual characteristics of the raw mix.

6. The method of claim 5 in which said reselecting of the desired characteristics ($Ch_D$) of the raw mix composition over the next subsequent time interval includes adjusting the overall desired characteristics (Ch) by the following formula:

$$Ch_D + \sin\left(\frac{(Ch - Ch_A)}{M}\right) \times M$$

where M is a selected maximum correction.

7. The method of claim 1 in which said calculating of actual characteristics of the raw mix includes calculating characteristics based upon a time weighted average of the chemical analyses of the raw mix over several previous time intervals.

8. A method for regulating the mixture of limestone with other raw materials to produce a cement raw mix of desired composition, said method comprising the steps of:
   (1) selecting the desired characteristics of the raw mix to be produced;
   (2) based upon estimated chemical compositions of the limestone and the other raw materials, determining the relative proportions of the limestone ($W_L$) and of the other raw materials to be mixed to produce a raw mix having the selected desired characteristics;

(3) producing a raw mix for a time interval by mixing limestone with other raw materials in the determined relative proportions;

(4) after producing the raw mix for the time interval, directly analyzing the chemical composition of the produced raw mix;

(5) determining the relative proportion ($T_L$) of limestone that, based upon the estimated chemical compositions of the limestone, would theoretically have produced raw mix having the analyzed chemical composition;

(6) adjusting the estimated chemical composition of the limestone by adjusting at least the estimated calcium oxide, silica oxide, aluminum oxide and iron oxide content in the limestone in response to the degree of divergence between $T_L$ and $W_L$; and (7) repeating steps one through three.

9. The method of claim 8 in which said chemical composition estimating includes the steps of:

(a) directly analyzing the chemical composition of the several other raw materials;

(b) producing raw mix by mixing the limestone and the several other raw materials for a time interval in relative proportions ($P_i$):

(c) directly analyzing the chemical composition of the raw mix produced by said mixing in relative proportions ($P_i$); and (d) based upon differences in component presence between the raw mix produced by said mixing in relative proportions ($P_i$) and the combined several other raw materials, estimating the chemical composition of the limestone.

10. The method of claim 8 in which said adjusting of the estimated chemical composition includes adjusting the estimated silica oxide, aluminum oxide, and iron oxide content in each of the raw materials in response to the degree of divergence between $T_i$ and $W_i$ for each of the raw materials.

11. A method for regulating the mixture of limestone with other raw materials to produce a cement raw mix of desired composition, said method comprising the steps of:

(1) estimating the chemical composition of the limestone and the several other raw materials, including estimating of the calcium oxide content (C) the silica oxide content (S) the alumina oxide content (A) and the ferric oxide content (F) in the raw materials;

(2) selecting the desired characteristics of the overall raw mix composition, including the desired Lime Saturation Factor (LSF), the desired Silica Ratio (SR), and the desired Aluminum to Iron Ratio (AIR);

(3) solving the following sets of equations to determine the relative proportions ($W_i$) of raw material to produce raw mix of the desired characteristics:

$$\Sigma W_i = 1$$

$$\frac{100 \times \Sigma(C_i W_i)}{2.8 \times \Sigma(S_i W_i) + 1.65 \times \Sigma(A_i W_i) + .35 \times \Sigma(F_i W_i)} = LSF_D$$

$$\frac{\Sigma S_i W_i}{\Sigma A_i W_i + \Sigma F_i W_i} = SR_D$$

$$\frac{\Sigma A_i W_i}{\Sigma F_i W_i} = AIR_D$$

(4) producing raw mix for a time interval by mixing raw materials in relative proportions $W_i$;

(5) after producing the raw mix for the time interval, directly analyzing the chemical composition of the raw mix ($C_A$, $S_A$, $A_A$, $F_A$ . . . ) and calculating the Lime Saturation Factor ($LSF_A$), the Silica Ratio ($SR_A$) and the Aluminum to Iron Ratio ($AIR_A$) of the raw mix produced;

(6) solving the following sets of equations to determine the theoretical relative proportions ($T_i$) of the raw materials that would have theoretically produced the actual composition of the raw mix:

$$\Sigma T_i = 1$$

$$\frac{100 \times \Sigma(C_i T_i)}{2.8 \times \Sigma(S_i T_i) + 1.65 \times \Sigma(A_i T_i) + .35 \times \Sigma(F_i T_i)} = LSF_A$$

$$\frac{\Sigma A_i T_i}{\Sigma A_i T_i + \Sigma F_i T_i} = SR_A$$

$$\frac{\Sigma A_i T_i}{\Sigma F_i T_i} = AIR_A$$

(7) adjusting the estimated chemical compositions of the limestone and the several other raw materials by adjusting at least the estimated calcium oxide (C), content in each of the raw materials in response to the degree of divergence between $T_i$ and $W_i$ respectively for each of the raw materials;

(8) reselecting the desired characteristics of the raw mix composition ($LSF_D$, $SR_D$, $AIR_D$) for the next subsequent time interval to adjust the overall raw mix towards the overall desired characteristics (LSF, SR, AIR); and (9) repeating steps three through eight.

12. The method of claim 11 additionally including the steps of checking for faulty weighfeeder conditions, said checking including sensing the degree of divergence between $T_i$ and $W_i$.

13. The method of claim 12 in which said checking for faulty weighfeeder conditions additionally includes comparing degree of actual divergence between $T_i$ and $W_i$ for each raw material with selected maximum permissible divergence (non-fault condition) for each raw material, and indicating the possibility of weighfeeder malfunction when the degree of actual divergence for a raw material exceeds the maximum permissible divergence (non-fault condition) for that raw material.

14. A method for regulating the mixture of limestone with other raw materials to produce a cement raw mix of desired composition, said method comprising the steps of:

(1) estimating the chemical composition of the limestone and the several other raw materials, including estimating of the calcium oxide content (C) the silica oxide content (S) the alumina oxide content (A) and the ferric oxide content (F) in the raw materials;

(2) selecting the desired characteristics of the overall raw mix composition, including the desired Lime Saturation Factor (LSF), the desired Silica Ratio (SR), and the desired Aluminum to Iron Ratio (AIR);

(3) solving the following sets of equations to determine the relative proportions ($W_i$) of raw material to produce raw mix of the desired characteristics:

$$\Sigma W_i = 1$$

$$\frac{100 \times \Sigma(C_i W_i)}{2.8 \times \Sigma(S_i W_i) + 1.65 \times \Sigma(A_i W_i) + .35 \times \Sigma(F_i W_i)} = LSF_D$$

$$\frac{\Sigma S_i W_i}{\Sigma A_i W_i + \Sigma F_i W_i} = SR_D$$

$$\frac{\Sigma A_i W_i}{\Sigma F_i W_i} = AIR_D$$

(4) producing raw mix for a time interval by mixing raw materials in relative proportions $W_i$;

(5) after producing the raw mix for the time interval, directly analyzing the chemical composition of the raw mix ($C_A$, $S_A$, $A_A$, $F_A$ ...) and calculating the Lime Saturation Factor ($LSF_A$), the Silica Ratio ($SR_A$) and the Aluminum to Iron Ratio ($AIR_A$) of the raw mix produced;

(6) solving the following sets of equations to determine the theoretical relative proportions ($T_i$) of the raw materials that would have theoretically produced the actual composition of the raw mix:

$$\Sigma T_i = 1$$

$$\frac{100 \times \Sigma(C_i T_i)}{2.8 \times \Sigma(S_i T_i) + 1.65 \times \Sigma(A_i T_i) + .35 \times \Sigma(F_i T_i)} = LSF_A$$

$$\frac{\Sigma A_i T_i}{\Sigma A_i T_i + \Sigma F_i T_i} = SR_A$$

$$\frac{\Sigma A_i T_i}{\Sigma F_i T_i} = AIR_A$$

(7) adjusting the estimated chemical compositions of the limestone and the several other raw materials by adjusting at least the estimated calcium oxide (C), silica oxide (S), aluminum oxide (A), and iron oxide (F) content in the limestone in response to the degree of divergence between $T_{limestone}$ and $W_{limestone}$.

(8) reselecting the desired characteristics of the raw mix composition ($LSF_D$, $SR_D$, $AIR_D$) over the next subsequent time interval to adjust the overall raw mix towards the overall desired characteristics (LSF, SR, AIR); and (9) repeating steps three through eight.

15. The method of claim 14 in which said chemical composition estimating includes the steps of:

(a) directly analyzing the chemical composition of the several other raw materials;

(b) producing raw mix by mixing the limestone and the several other raw materials for a time interval in relative proportions ($P_i$);

(c) directly analyzing the chemical composition of the raw mix produced by said mixing in relative proportions ($P_i$); and (d) based upon differences in component presence between the raw mix produced by said mixing in relative porportions ($P_i$) and the combined several other raw materials, estimating the chemical composition of the limestone.

16. The method of claim 14 additionally including the step of adjusting estimated components in the other raw materials in response to the degree of divergence between $T_i$ and $W_i$ for each of the other raw materials.

17. The method of claim 16 additionally including the steps of checking for faulty weighfeeder conditions, said checking including sensing the degree of divergence between $T_i$ and $W_i$.

18. The method of claim 16 in which said checking for faulty weighfeeder conditions additionally includes comparing degree of actual divergence between $T_i$ and $W_i$ for each raw material with selected maximum permissible divergence (non-fault condition) for each raw material, and indicating the possibility of weighfeeder malfunction when the degree of actual divergence for a raw material exceeds the maximum permissible divergence (non-fault condition) for that raw material.

19. The method of claim 16 in which said selecting of new desired characteristics for the next subsequent time period includes selecting of new desired characteristics which compensatingly deviate from the overall desired characteristics in a manner which is decreasingly proportionate to the extent of deviation between the overall desired characteristics and the actual characteristics of the raw mix.

20. The method of claim 16 in which said reselecting of the desired characteristics ($Ch_D$) of the raw mix composition over the next subsequent time interval includes adjusting the overall desired characteristics (Ch) by the following formula:

$$Ch_D = Ch + \sin\left(\frac{(Ch - Ch_A)}{M}\right) \times M$$

where M is a selected maximum correction.

21. The method of claim 16 in which said calculating of actual characteristics of the raw mix includes calculating characteristics based upon a time weighted average of the chemical analyses of the raw mix over several previous time intervals.

* * * * *